US010673328B2

(12) United States Patent
Bari et al.

(10) Patent No.: US 10,673,328 B2
(45) Date of Patent: Jun. 2, 2020

(54) INVERSE CHARGE CURRENT MODE (IQCM) CONTROL FOR POWER CONVERTER

(71) Applicant: Virginia Tech Intellectual Properties, Inc., Blacksburg, VA (US)

(72) Inventors: Syed Bari, Blacksburg, VA (US); Fred C. Lee, Blacksburg, VA (US); Qiang Li, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 360 days.

(21) Appl. No.: 15/089,744

(22) Filed: Apr. 4, 2016

(65) Prior Publication Data

US 2016/0301303 A1 Oct. 13, 2016

Related U.S. Application Data

(60) Provisional application No. 62/143,868, filed on Apr. 7, 2015.

(51) Int. Cl.
*H02M 3/04* (2006.01)
*H02M 3/156* (2006.01)

(52) U.S. Cl.
CPC .... *H02M 3/156* (2013.01); *H02M 2003/1566* (2013.01)

(58) Field of Classification Search
CPC ....... H02M 3/156–1588; H02M 3/1566–1588; H02M 1/156–1588; H02M 1/04
USPC .......................................... 323/288
See application file for complete search history.

(56) References Cited

U.S. PATENT DOCUMENTS

| 7,772,904 B1* | 8/2010 | Cooke | H02M 3/157 |
| | | | 327/175 |
| 2010/0026262 A1* | 2/2010 | Sase | H02M 3/156 |
| | | | 323/283 |
| 2010/0320992 A1* | 12/2010 | Dearn | H02M 3/1582 |
| | | | 323/311 |
| 2011/0279098 A1* | 11/2011 | Ren | H02M 3/1582 |
| | | | 323/234 |
| 2012/0112721 A1* | 5/2012 | Wu | H02M 3/156 |
| | | | 323/288 |
| 2012/0293156 A1* | 11/2012 | Galbis | H02M 3/1588 |
| | | | 323/350 |
| 2014/0097818 A1* | 4/2014 | Wiktor | H02M 3/156 |
| | | | 323/283 |
| 2015/0280556 A1* | 10/2015 | Bari | H02M 3/156 |
| | | | 323/282 |

(Continued)

*Primary Examiner* — Nguyen Tran
*Assistant Examiner* — Lorena D Bruner
(74) *Attorney, Agent, or Firm* — W&C IP

(57) ABSTRACT

An amount of charge transferred by a power converter is estimated by developing a signal that is a combination of signals representing an output voltage of a power converter and an inductor current of the power converter, charging a capacitor with a current proportional to that signal and comparing a voltage developed across the capacitor due to that charging to develop a signal for initiating a pulse to control input of power from a voltage source to the power converter. By using a signal developed in this way, response to both step-up and step-down transients can be improved and, in multi-phase embodiments, ripple cancellation problems such as noise susceptibility and loss of pulse generation can be entirely avoided.

20 Claims, 35 Drawing Sheets

(56) References Cited

U.S. PATENT DOCUMENTS

2016/0049859 A1* 2/2016 de Cremoux ......... H02M 3/156
                                                                                323/282

* cited by examiner

US 10,673,328 B2

INVERSE CHARGE CURRENT MODE (IQCM) CONTROL FOR POWER CONVERTER

CROSS-REFERENCE TO RELATED APPLICATIONS

This application claims benefit of priority of U.S. Provisional Application 62/143,868, filed Apr. 7, 2015, which is hereby incorporated by reference in its entirety.

FIELD OF THE INVENTION

The present invention generally relates to DC-DC power converters and, more particularly, to a control method and system for DC-DC power converters that provides fast response to load transients.

BACKGROUND OF THE INVENTION

At the present time, most electrical power is generated and distributed as alternating current (AC) power for reasons of convenience and economy since AC power can be distributed at high voltage to reduce current and losses over power lines of reduced cost and the voltage locally reduced by transformers even though most electrical and electronic devices other than motors operate from a relatively constant voltage referred to as direct current (DC) which can be produced from an AC power source through use of simple rectifier devices or arrangements. Recently, however, there has been increased interest in substantially local generation of power from so-called renewable resources such as solar collectors and wind turbines that generally are arranged to produce DC power at a relatively high voltage which can be efficiently distributed and/or stored locally to the point of power generation; requiring the voltage to be reduced and usually regulated within a small voltage tolerance for operation of many electronic devices through use of DC-DC converters.

While many designs and approaches to DC-DC conversion have become known and accommodate the power requirements of various electronic devices relatively well, there is an increasing need for extremely rapid response to changes in the electrical load presented by the device to which power is being supplied. For example, digital data processing devices have become ubiquitous in many electrical and electronic devices to increase functionality and ease of use but present loads which can vary from very low currents in a stand-by or so-called "sleep" state to currents of many Amperes when operating at full clock cycle speeds which have greatly increased in recent years. The problem of rapid transient response has proven to be largely intractable, particularly in switching power converters and regulators which, in addition to delays in signal propagation time to alter switching parameters, require several switching cycle periods to make large step-up or step-down changes in steady-state current. Therefore, the change in load current occurs in increments to reach an increased steady-state current which cannot be optimally rapid since each switching cycle will include some finite period when the input power is interrupted.

While some approaches have been proposed to improve transient response of DC-DC power converters for step-up load transients, none have been effective of improving load transient response for step-down transients or even affecting step-down load transient response at all due to the nature of a step-down load transient, itself, which can cause excess charge to be delivered to a filter/output capacitor and output voltage overshoot even though the switching cycle is completely interrupted and no power is being delivered from the input power supply. In such cases, voltage regulation is lost and can be large enough to cause malfunction of or damage to a load, particularly if the load is a digital processing or storage device.

SUMMARY OF THE INVENTION

It is therefore an object of the present invention to provide a control method and system that provides load transient response of increased speed that reduces time prior to resumption of steady-state operation.

It is another object of the invention to improve load transient response for both step-up and step-down load transients.

It is a further object of the invention to provide an improved current mode control applicable to any known or foreseeable DC-DC power converter topology of single or multiple phases.

In order to accomplish these and other objects of the invention, a power converter is provided comprising a pulse generator for generating pulses for controlling connection of the power converter to a power source, a circuit for developing a control voltage corresponding to a combination of output voltage and inductor current of the power converter, a transconductance amplifier for developing a current proportional to the combination of output voltage and inductor current for charging a capacitor, and a control circuit responsive to a voltage on the capacitor reaching a threshold for controlling the pulse generator.

In accordance with another aspect of the invention, a method of controlling a power converter is provided comprising steps of developing a voltage representing a combination of output voltage of the power converter and an inductor current of the power converter, charging a capacitor with a current proportional to the voltage developed in the developing step, comparing a voltage developed across the capacitor by the charging step with a threshold, and controlling a switch driver for applying input power to an inductor of the power converter in accordance with a result of the comparing step.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED

Embodiment of the Invention

Figure 1:
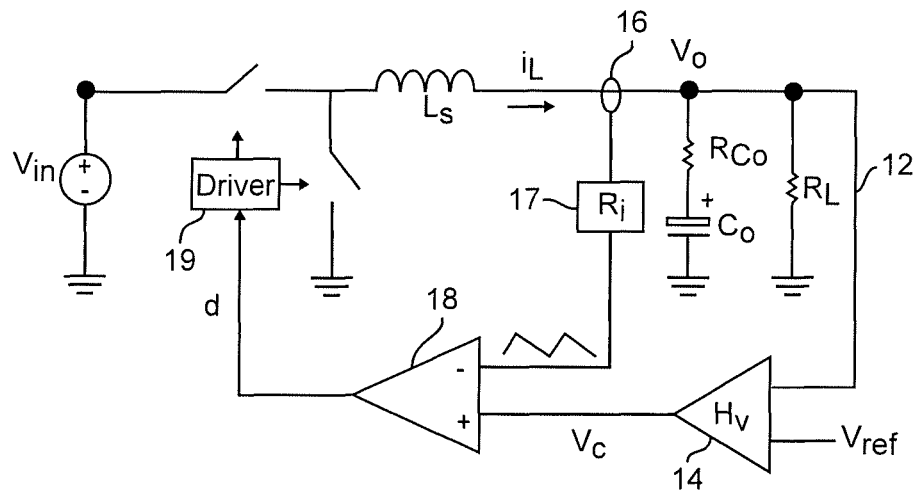
FIG. 1 is a schematic diagram of a current mode control circuit useful for conveying and understanding of the invention by comparison therewith.

Referring now to the drawings, and more particularly to FIG. 1, there is schematically shown a very basic power converter structure employing current mode control. It should be understood that FIG. 1 and other FIGS. 2-32 are generalized and arranged to facilitate understanding of the basic principles of power converter control and the limitations and problems thereof which will, in turn, facilitate conveying an understanding and appreciation of the invention and its meritorious effects by comparison therewith. Therefore, no portion of any of FIGS. 1-32 is admitted as prior art in regard to the present invention and these figures have been labeled "Related Art". It should also be understood that while the invention will be generally illustrated and discussed in the context of a so-called buck-converter topology because of its simplicity and familiarity, the invention is equally applicable to any other single or multi-phase switching power converter topology.

Figure 2:
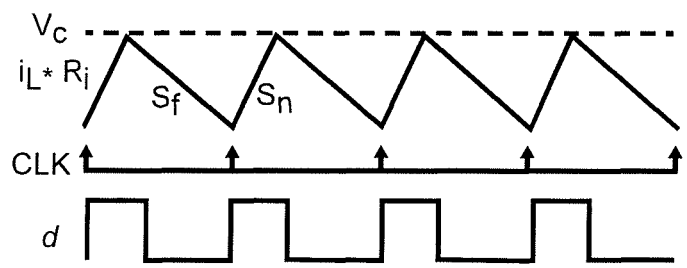
FIG. 2 illustrates waveforms involved in current mode control.

Current mode power converter control as illustrated in FIG. 1 has been widely used in power converter designs for several decades to provide efficient and stable voltage regulation of high accuracy. Essentially, current mode control differs from voltage mode control in which an output voltage is fed back through loop 12 to a comparator 14 (also sometimes referred to as a compensator) for comparison with a reference voltage, $V_{ref}$, to provide a control voltage, $V_c$, by providing a sensor 16 for inductor current in a further feedback loop having gain 17, $R_i$, which is compared with $V_c$ to provide a pulse train, d, to control switch driver 19. Since the pulse train controls connection and disconnection of the power converter with a source of input power, the inductor current will have a triangular waveform $i_L*R_i$ with rising and falling periods of slope $S_n$ and $S_f$, respectively, corresponding to the duty cycle and/or frequency of pulse train d, as shown in FIG. 2 which will be of constant period and duty cycle at steady-state. For some variant forms of current mode control that operate at a fixed frequency, as will be discussed below, a clock input, CLK, may also be applied to switch driver 19. This could be an independent clock or a set/reset latch responsive to a clock and a feedback signal similar to some embodiments that will be described below, as will be apparent to those skilled in the art. Thus, it is seen that current mode passes accurately limited amounts of current through the inductor to the output/filter capacitor of the power converter to achieve highly accurate voltage regulation.

Figure 3A:
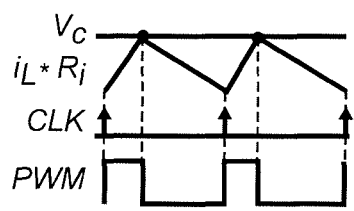
FIGS. 3A, 3B, 3C, 3D and 3E illustrate waveforms for different forms of current mode control, also useful for conveying an appreciation of novel aspects of the invention through comparison therewith, FIG. 4 schematically illustrates a constant on-time (COT) control arrangement.
Figure 3B:
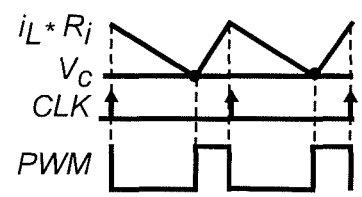
Figure 3C:
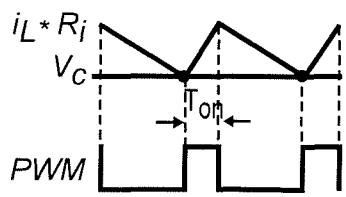
Figure 3D:
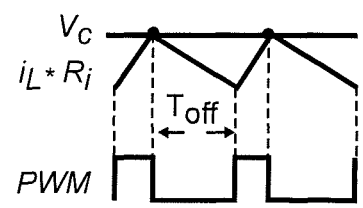
Figure 3E:
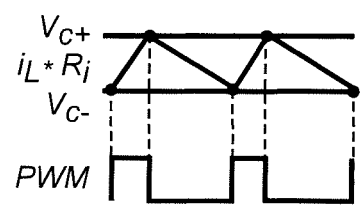

It should be appreciated that the comparison performed at comparator 18 can be performed in numerous ways to determine switching times for yielding a pulse train. For example FIG. 3A illustrates a comparison of a peak of $i_L*R_i$, referred to as peak current mode control. Conversely, FIG. 3B illustrates a valley current mode control. Both peak and valley control modes are clocked and operate at a fixed frequency but variable pulse width and duty cycle depending on sensed inductor current. As variants thereof, FIG. 3C illustrates a constant on-time control and FIG. 3D illustrates constant off-time control in which the switching frequency changes to alter duty cycle with load. Constant on-time and constant off-time control modes provide variable frequency operation, depending on inductor current. As a further variation, two comparators and reference voltages can be provided for so-called hysteretic control as illustrated in FIG. 3E, in which both frequency and pulse width are controlled to match the load. In addition, a so-called average current mode control can be provided by placing a low-pass filter in the inductor current feedback path to improve noise immunity, particularly at light loads where the amplitude of $i_L*R_i$ is low.

In general, a variable frequency control mode provides better light load efficiency and high bandwidth design capability. Variable frequency control also exhibits reduced switching delay as compared with peak current control operating at a fixed clock frequency. Therefore, constant on-time (COT) and constant off-time arrangements are generally preferred but also have significant limitations.

Figure 4:
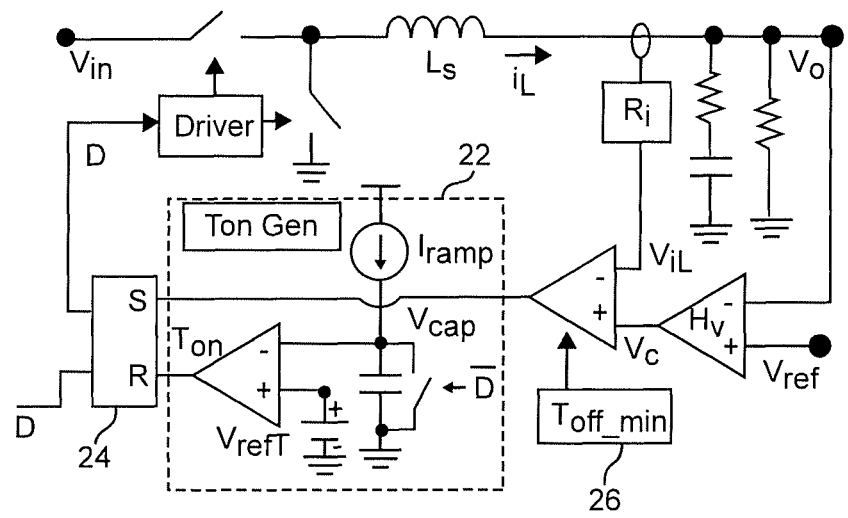
Figure 5:
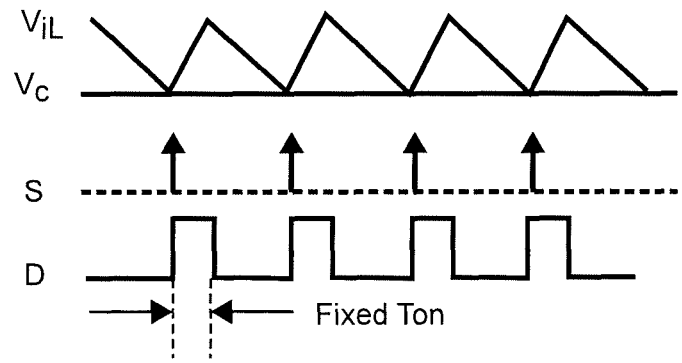
FIG. 5 illustrates waveforms involved in constant on-time control, FIG. 6 schematically illustrates an adaptive on-time (AOT) control arrangement.

Specifically, a typical COT architecture is shown in FIG. 4 and its operational waveforms are illustrated in FIG. 5. A constant on-time, $T_{on}$, is generated by a circuit 22 having a constant current source, $I_{ramp}$, that charges a capacitor to develop a voltage ramp which is compared with a time-reference voltage $V_{refT}$ to reset latch 24 that is set when (after a minimum off-time 26) the voltage representing the sensed inductor current equals the control voltage, $V_c$. Pulse signal D of constant duration is produced when latch 24 is set and its complement is produced to discharge the capacitor when latch 24 is reset. The basic benefit of COT control is that it is best modeled which has a double pole located at a high frequency and having a high quality factor which allows the control bandwidth to be very high to achieve fast transient response.

Figure 6:
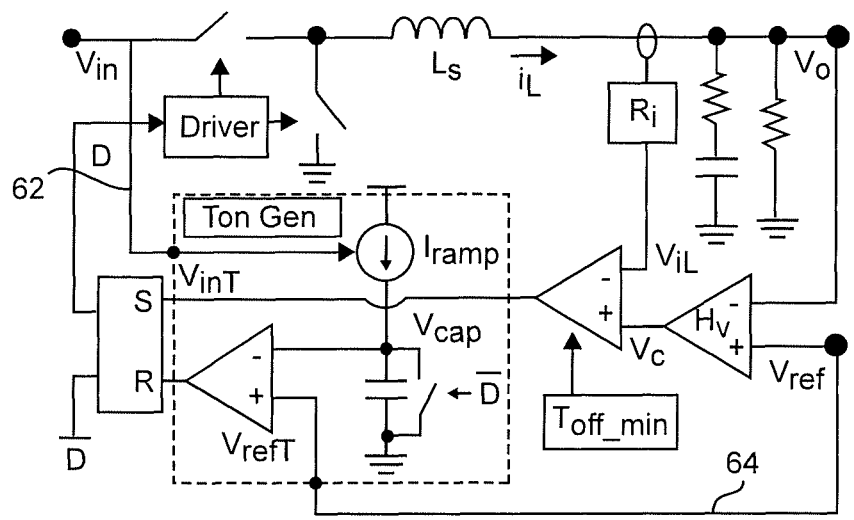

One significant drawback of COT control is the variation of switching frequency, $f_{sw}$, over the full range of switching duty cycle when the load is variable over a wide range. Two techniques of limiting frequency range are referred to as adaptive on-time control are illustrated in FIG. 6. One technique is to monitor the input voltage, $V_{in}$, to vary the current level used to charge the capacitor in the $T_{on}$ generator 22 as shown by arrow 62. The other is to set $V_{refT}$ in accordance with $V_{ref}$ as represented by exemplary connection 64. These techniques can be used singly or together to limit the frequency range needed to accommodate load variation.

Figure 7:
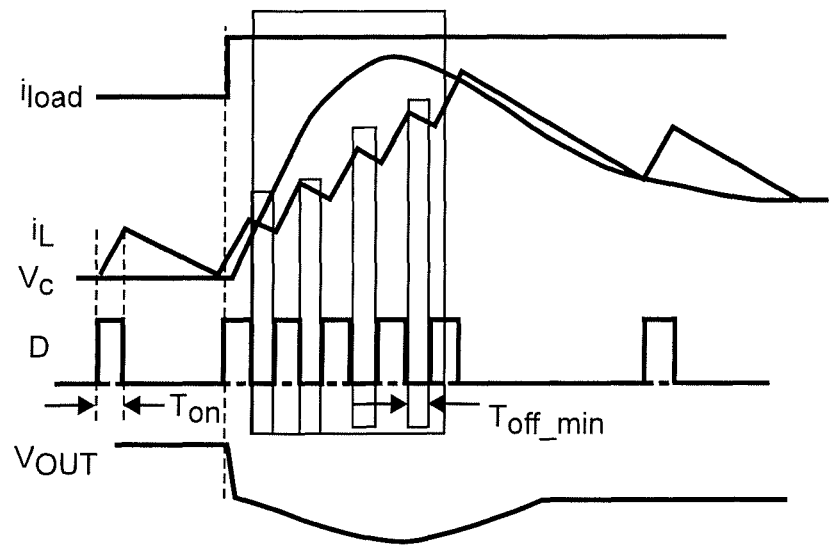
FIG. 7 illustrates waveforms involved in step-up load transients and resulting output voltage undershoot.

Another significant drawback of COT control is transient response, as alluded to above. A step-up load transient and the power converter transient response waveforms are illustrated in FIG. 7. As noted above, a COT control mode, even with AOT, requires a minimum off-time between switching pulses D. When a large step-up transient occurs, the output voltage is pulled down and the control voltage, $V_c$, rises sharply. However the inductor current represented by $i_L*R_i$ cannot increase sharply enough to follow $V_c$. While the frequency of pulse train D increases sharply, it is limited and the switching pulses saturate due to the required minimum off-time between pulses, $T_{off\_min}$, and the current increases toward a new steady-state in a plurality of steps and a large undershoot appears in the output voltage that persists for a significant period of time.

Figure 8:
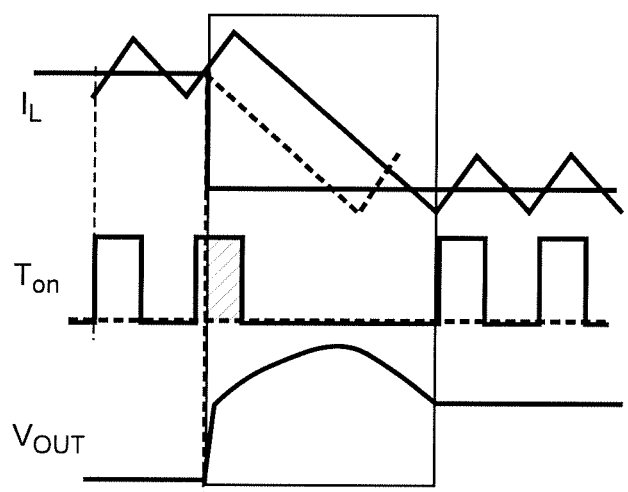
FIG. 8 illustrates waveforms involved in step-down load transients and resulting output overshoot.

The effect of a large step-down in load is largely a matter of timing relative to pulse train D which cannot be controlled. As illustrated in FIG. 8, the worst case transient response occurs when the step-down transient occurs immediately after the onset of a switching pulse D such that a COT pulse continues after the step-down transient and delivers excess charge (depicted by the area between the solid and dashed lines) to the output/filter capacitor that is not required by the load. In fact, the area below the dashed line (indicating the best case where D is terminated concurrently with the step-down transient) also represents excess charge not required by the load. Accordingly the excess charge delivered to the output/filter capacitor causes a degree of overshoot in the output voltage.

Figure 9:
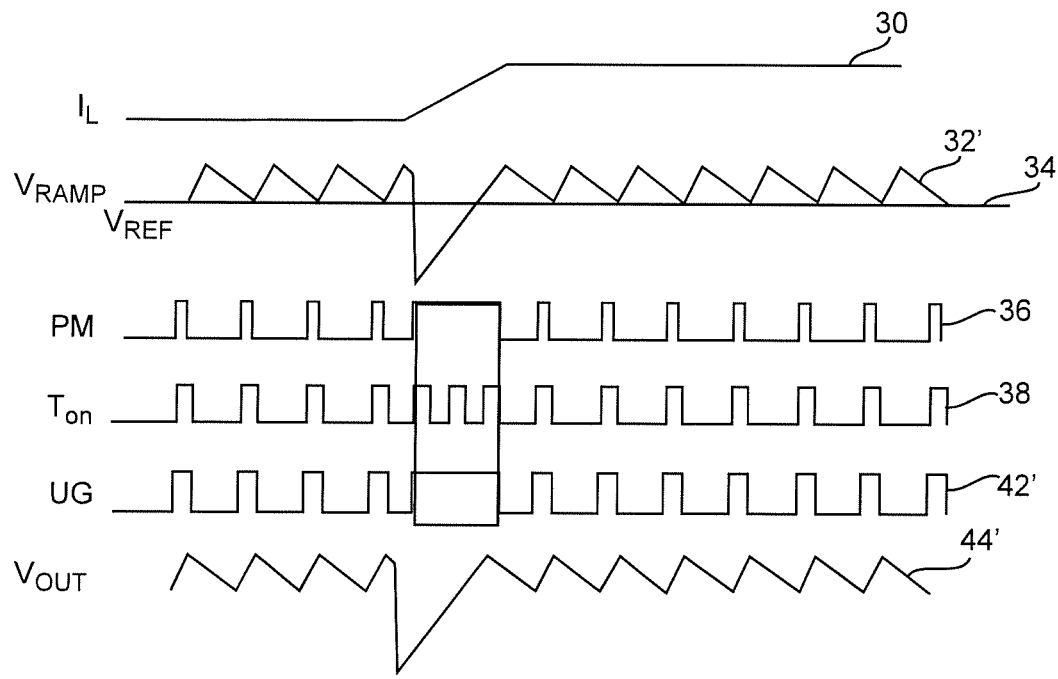
FIGS. 9, 10, 11 and 12 illustrate problems caused by prior approaches to improving step-up load transient response.
Figure 10:
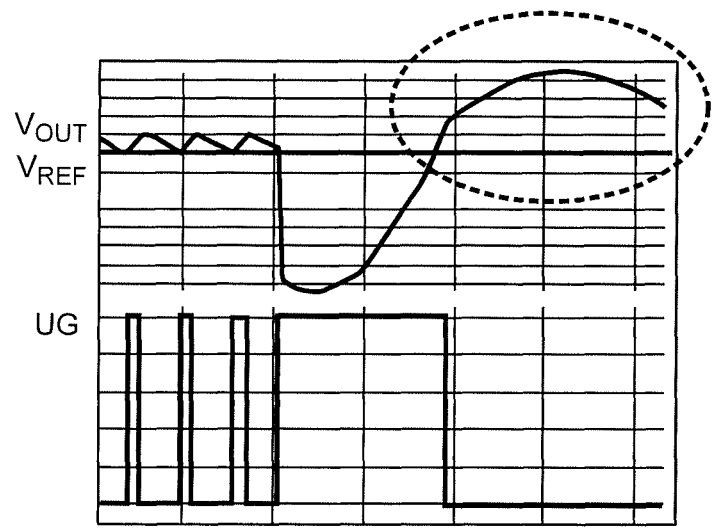
Figure 11:
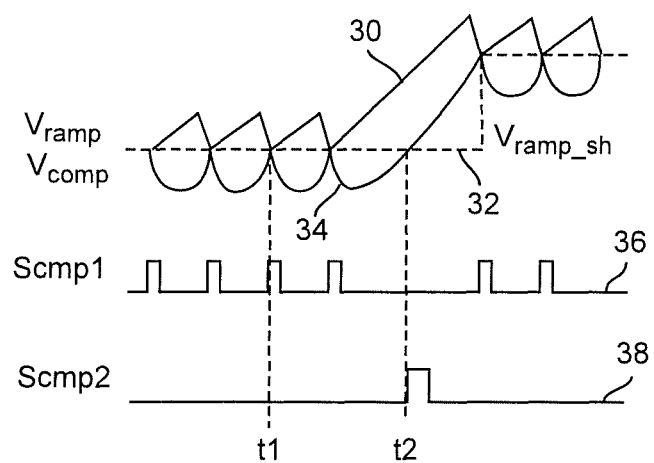
Figure 12:
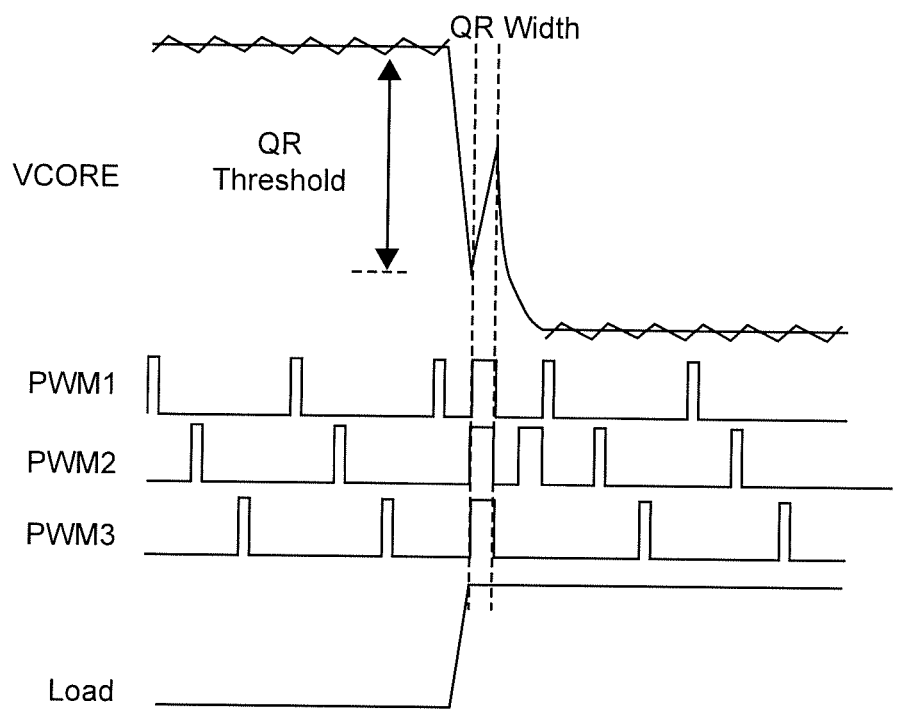

Several approaches to ameliorating these problems have been proposed. For example, it has been attempted to extend a switching pulse for the duration that the output voltage is below the regulation voltage (or $V_{ref}$) as illustrated in FIG. 9. However, the regulation tolerance and signal propagation time may cause the switching pulse to be extended beyond the required time causing over-correction and ring-back as illustrated within the dashed line in FIG. 10. Another somewhat similar expedient to improve load transient response has been to substitute a fixed duration but extended duration pulse for a pulse D as illustrated in the waveforms of FIG. 11 when the output of the compensator, $V_c$, rises above the regulation range. However, this latter approach, while improving load transient response time and reducing undershoot is only effective to eliminate undershoot for one particular magnitude of load current change.

Figure 13:
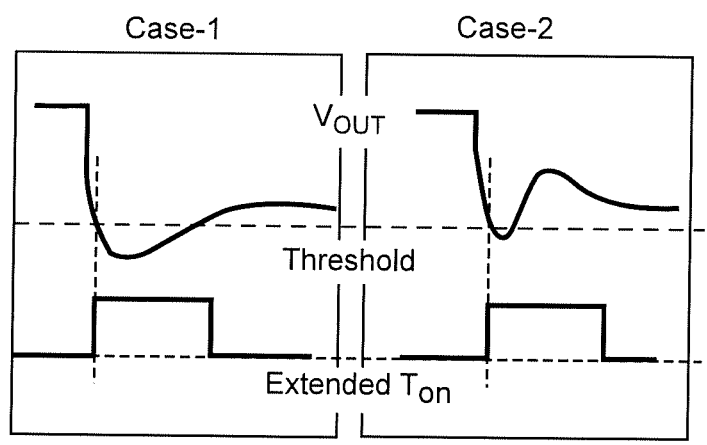
FIG. 13 illustrates waveforms exhibiting ring-back behavior at a load transient.

Multi-phase operation is more complex in regard to load transient response but provides some additional possible approaches to improving it. For example, one approach is to detect when regulation is lost due to a step-up load transient and to turn on a switching pulse, possibly of extended duration, in all phases. The drawback is that if the load transient is relatively small but still sufficient for loss of voltage regulation (or the load transient detection arrangement subject to false detection due to noise or the like), producing only a small undershoot, excess charge may be delivered to the filter capacitor and cause ring-back as shown in FIG. 13 as contrasted with the case where the $T_{on}$ only causes undershoot that is tolerable. In this regard, it is also difficult to determine a threshold for load transient detection that will be appropriate for all values of load amplitude and slew rate.

Figure 14:
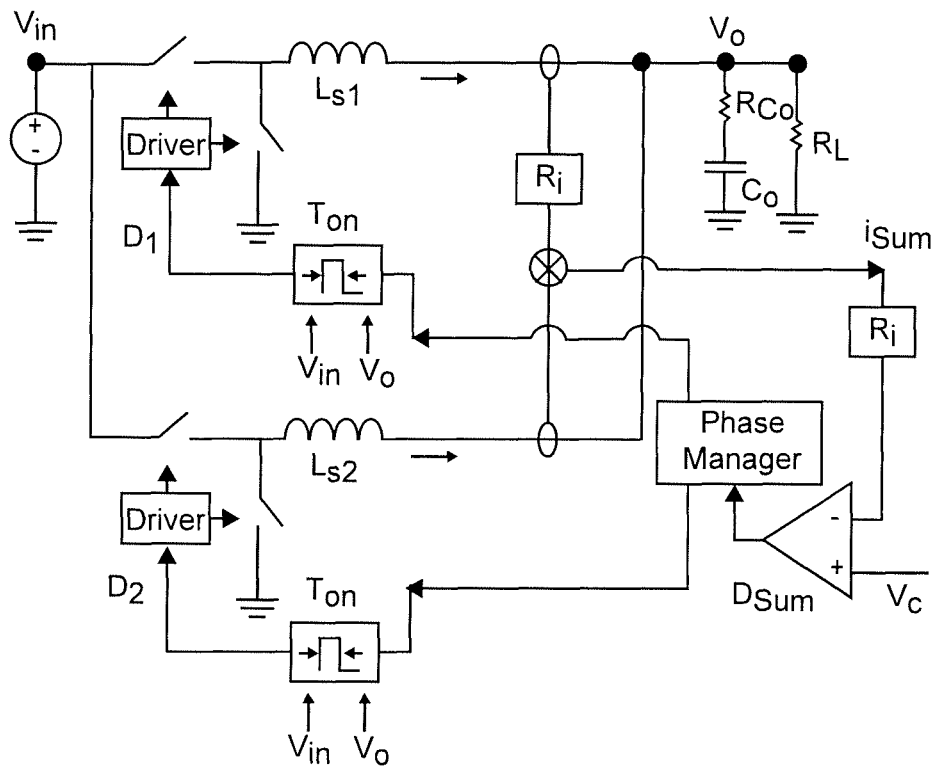
FIGS. 14 and 15 illustrate pulse distribution for a multi-phase DC-DC power converter and operational waveforms thereof.
Figure 15:
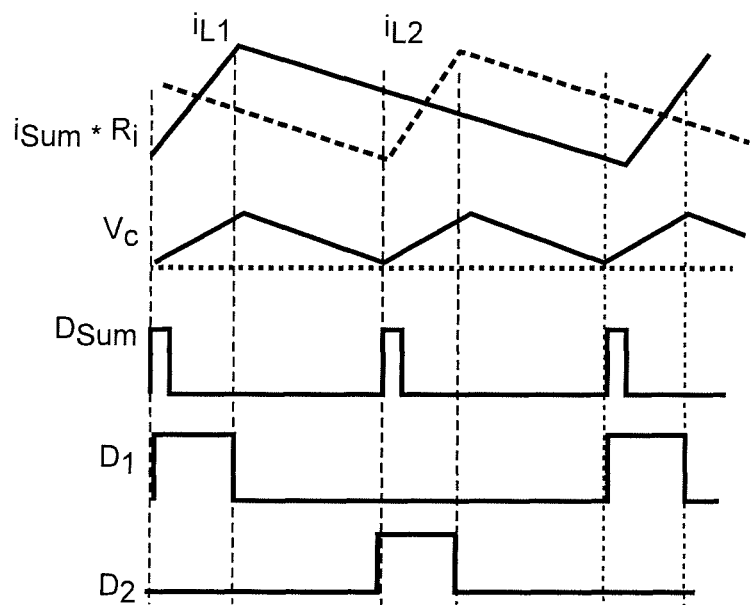

In multi-phase power converters using COT control, pulse distribution, in which pulses in a pulse train are distributed in turn to the individual phases by a phase manager as shown in FIG. 14, is very popular because of the simplicity of design. However, because individual pulses of a single pulse train (based on a sum of the currents of the individual phases) are distributed in a commutating manner, they cannot overlap to provide improved load transient response as shown in the key waveforms of FIG. 15.

Figure 16A:
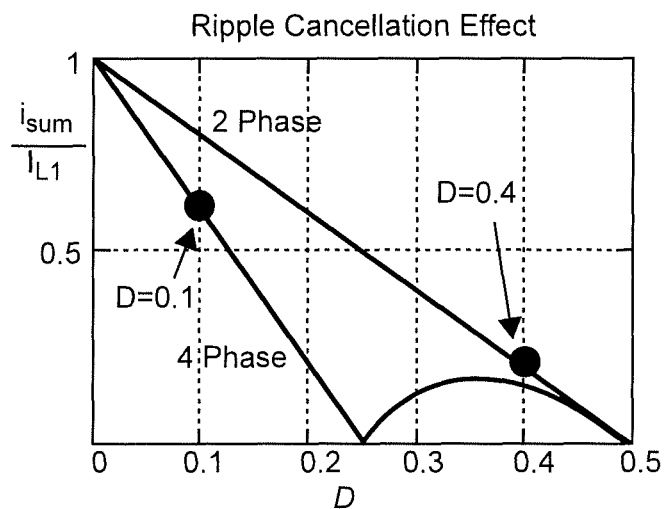
FIGS. 16A and 16B illustrate noise sensitivity engendered by ripple cancellation effects in multi-phase DC-DC converters.
Figure 16B:
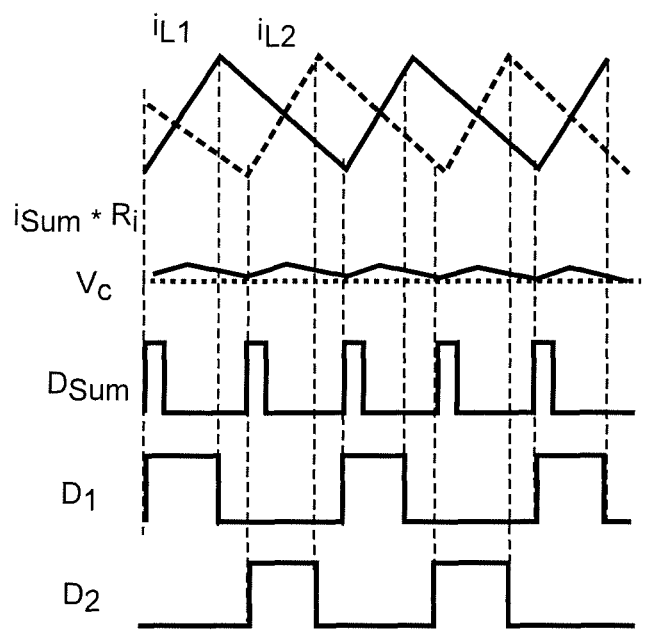
Figure 17A:
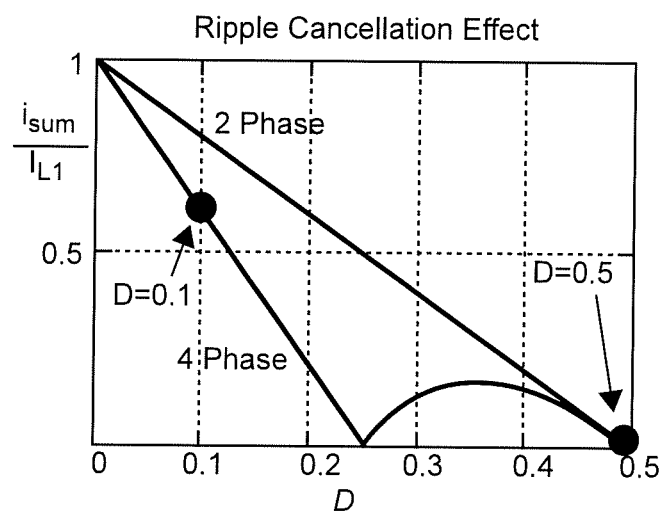
FIGS. 17A and 17B illustrate the operational failure at a complete ripple cancellation point in multi-phase DC-DC converters FIG. 18 schematically illustrates multi-phase COT control with an external ramp.
Figure 17B:
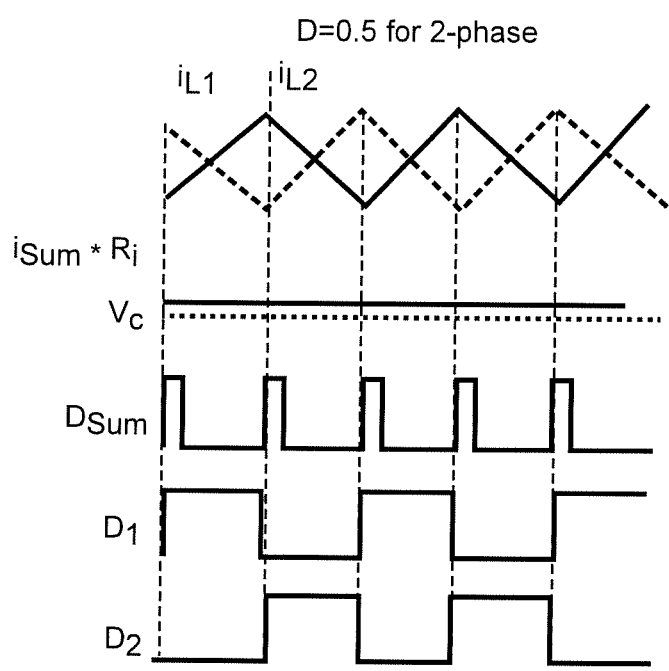

A significant issue in multi-phase power converters, particularly power converters operating at a fixed frequency or using adaptive on-time (AOT) control such that the duty cycle of the switching pulse train can vary, is that of ripple cancellation and the noise susceptibility engendered thereby. It will be recalled from the above discussion of single phase power converters using current mode control that the sensed inductor current is a triangular waveform/ripple which is also true for each respective phase of a multi-phase power converter. However, to monitor total current through a multi-phase power converter, the individual inductor currents, $i_L$, are summed to produce a signal, $i_{sum}$, in which the triangular waveforms of the individual phases overlap such that positive slope portions of the waveforms of some phases overlap with negative slope portions of other phases which tend to cancel each other. Thus, for a given number of phases of a multi-phase power converter there will be some $i_L$ pulse duty cycles at which there will be full cancellation as shown in FIGS. 17A and 17B and, at duty cycles close to such duty cycle values, the ripple in $i_{sum}$ will be very small as illustrated in FIGS. 16A and 16B. For example, it is seen from FIGS. 16A and 17A which plot the ratio of $i_{sum}$ to $i_L$ (e.g. $i_{sum}/i_L$) that there will be full ripple cancellation at a duty cycle of pulses D at a duty cycle of 0.5 and for four phases there will be full cancellation at duty cycles of 0.25 and 0.5 and so on and at, for example, in a four phase power converter, the amplitude variation of $i_{sum}*R_i$ will be very small at a duty cycle of 0.24 but much larger at a duty cycle of 0.1. Therefore, since switching pulses are generated by comparison of $i_{sum}*R_i$ and $V_c$, which will be substantially constant at steady-state, susceptibility to noise and instability and/or jittering of phase switching cycle timing is greatly increased at duty cycle values near the inductor current ripple cancellation points. Additionally, converter operation cannot continue at the full ripple cancellation point as shown in FIG. 17B. Unacceptable performance will therefore result during periods of total ripple cancellation even though such periods may be brief. To provide continuous acceptable operation or reduce the noise sensitivity, an external ramp is added for multi-phase COT operation.

Figure 18:
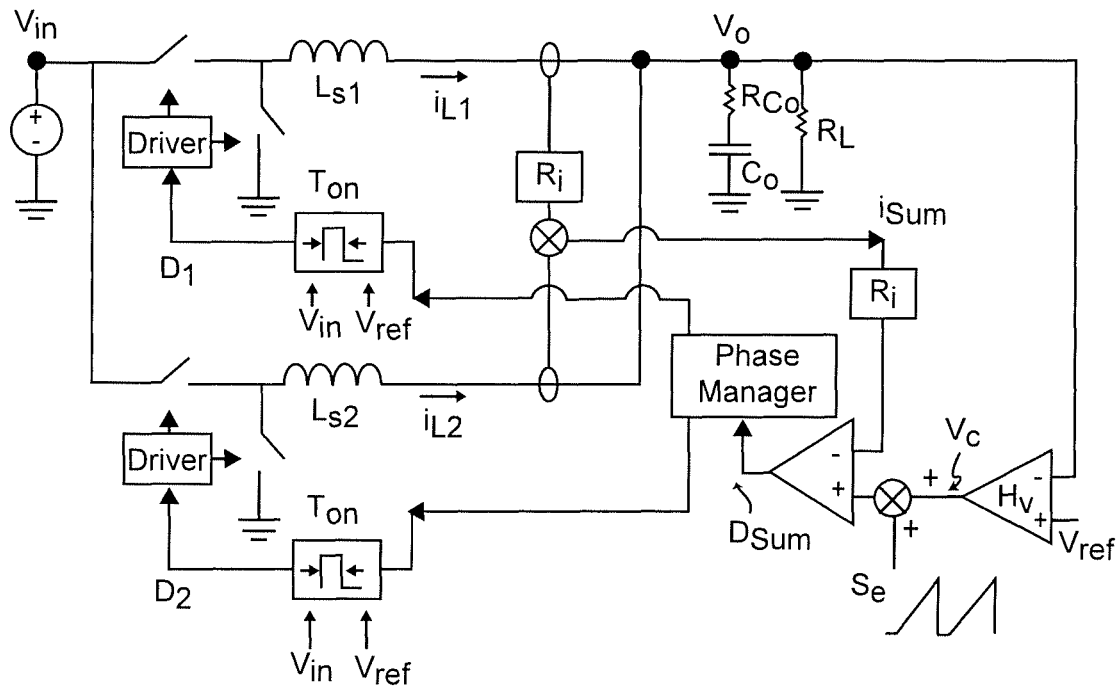
Figure 20:
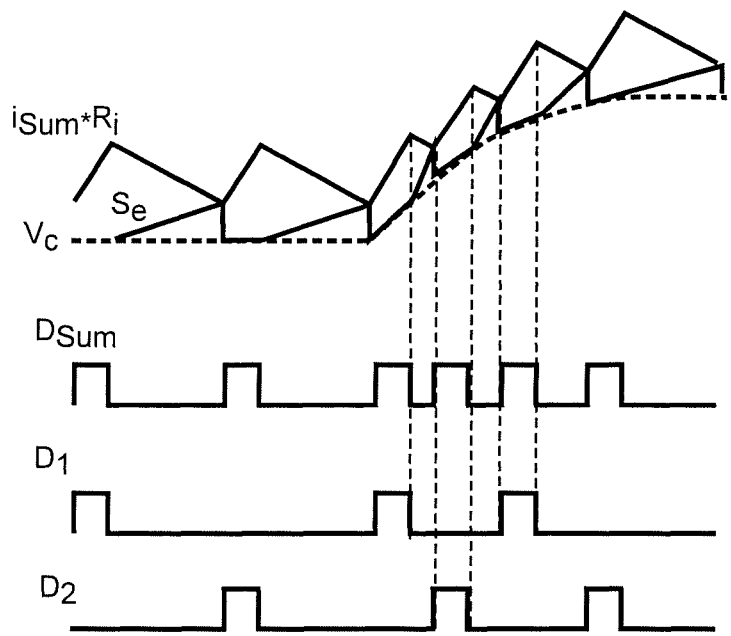
Figure 19:
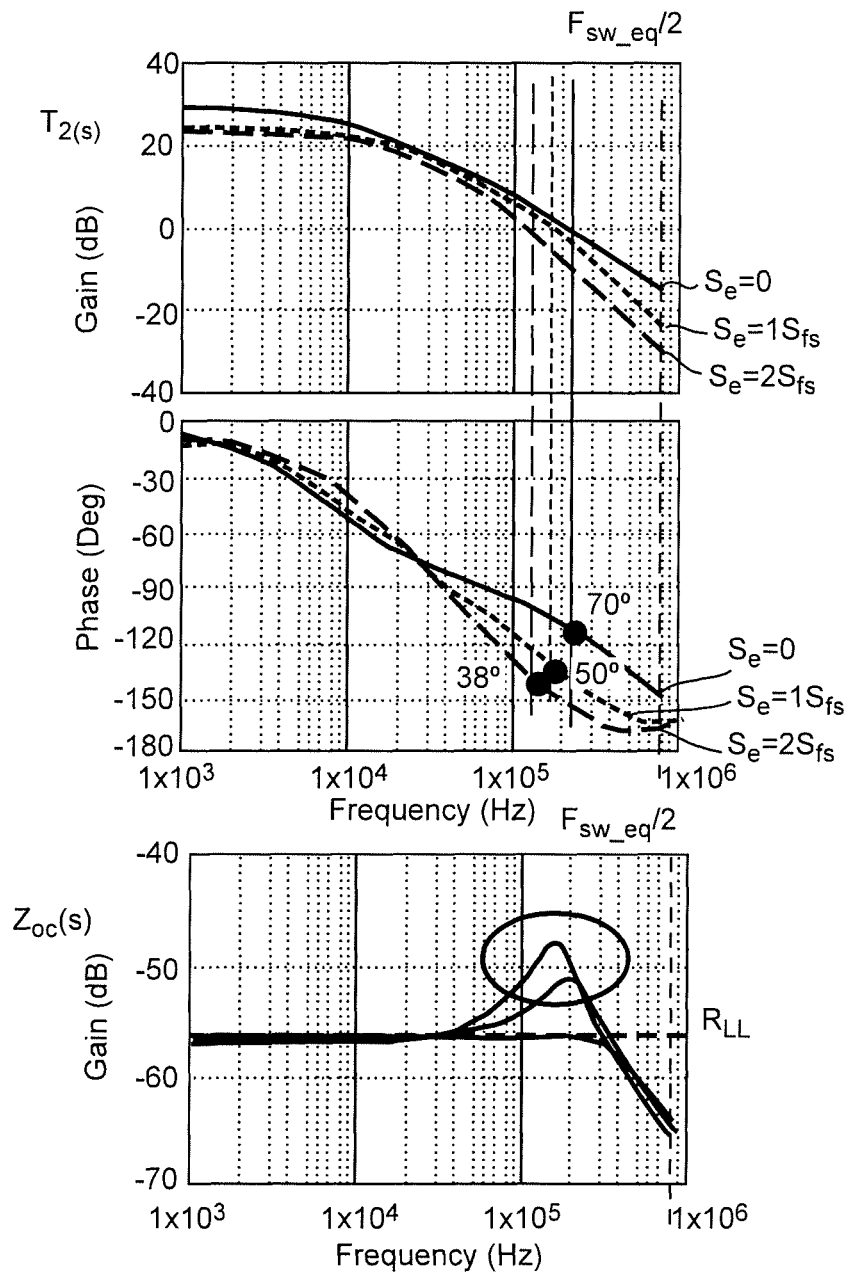
FIG. 19 illustrates small signal property degeneration for external ramp in multi-=phase COT control, FIG. 20 illustrate slower step-up transient response for lack of pulse overlapping in multi-phase COT control with an external ramp, FIGS. 21 and 22 respectively schematically illustrate an approach to on-time pulse overlapping in a multi-phase converter using phase locked loops and key waveforms thereof, FIGS. 23 and 24 respectively schematically illustrates an approach to on-time pulse overlapping in a multi-phase converter using a voltage controlled oscillator (VCO) and key waveforms thereof.

The problems due to inductor current ripple cancellation has been addressed by adding an external ramp waveform to $V_c$ as illustrated schematically in FIG. 18. However, use of such an external ramp waveform causes peaking of output impedance and overshoot to appear as illustrated graphically in the small signal characteristics shown in FIG. 19 as the external ramp overwhelms the small amplitude of $i_{sum}*R_i$ near the inductor current ripple cancellation points which, in turn, require an increase in output capacitance to reduce overshoot. As is particularly evident in FIG. 19, with increase of slope of the external ramp, $S_e$, the high frequency pole approaches the low frequency pole and compromises the phase of the loop gain while the output impedance of the converter increases which, in turn, increases undershoot and overshoot. Additionally, as shown graphically in FIG. 20, the load transient response can be slowed by the application of an external ramp since the external ramp makes the overlapping of different phases more difficult.

Figure 21:
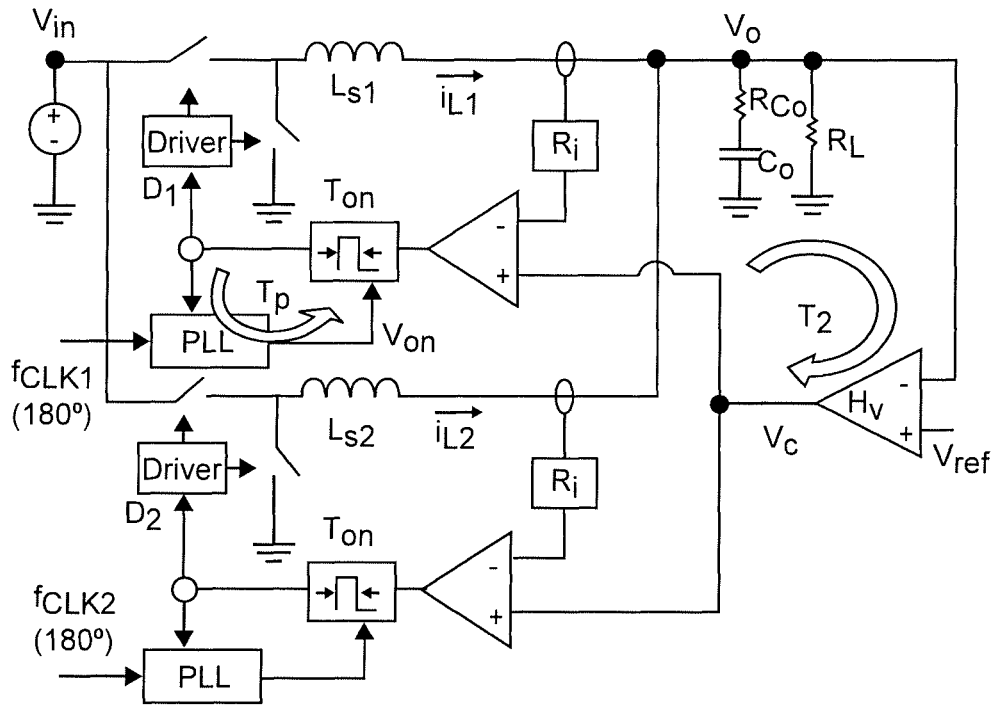
Figure 22:
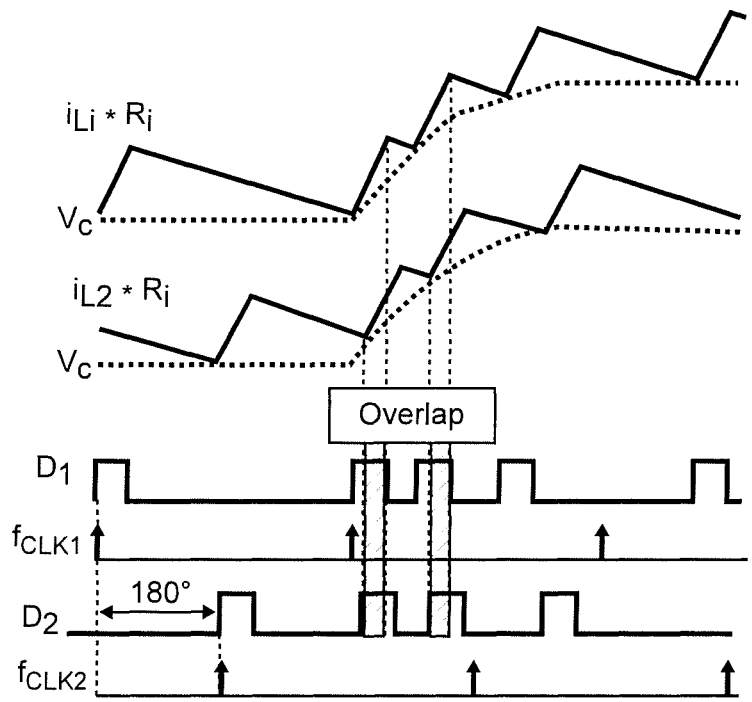

To overcome this limitation, a phase-locked loop (PLL) approach has been proposed. An exemplary two-phase configuration is shown in FIG. 21. Operation similar to constant frequency operation is achieved by adjusting the $T_{on}$ of each on-time generator slowly with the time control signal, $V_{on}$, from the PLL in each phase while the PLL forces each pulse width modulated (PWM) signal to follow a fixed frequency reference clock at the same frequency and phase angle. The speed of the $V_{on}$ change is determined by the bandwidth of the PLL, $T_p$. Interleaving is achieved by shifting the phase of the clock signals. Since the modulation of D1 and D2 is determined by the intersection if $V_c$ and the measured individual inductor current, the system is less noise sensitive and D1 and D2 can overlap naturally as illustrated in FIG. 22. While this approach is generally effective, complexity increases greatly with increased numbers of phases due to the requirement of a synchronized and phase shifted clock and a PLL for each phase. Further, stability problems may be caused by the bandwidth of $T_p$ and the trade-off with system performance in regard to transient response time.

Figure 23:
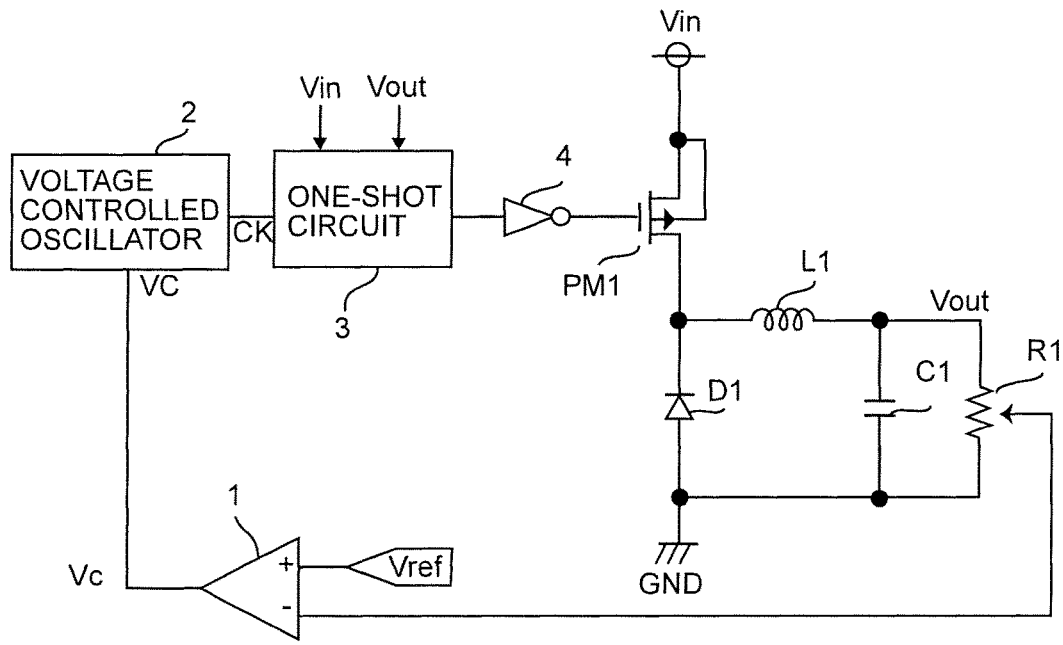
Figure 24:
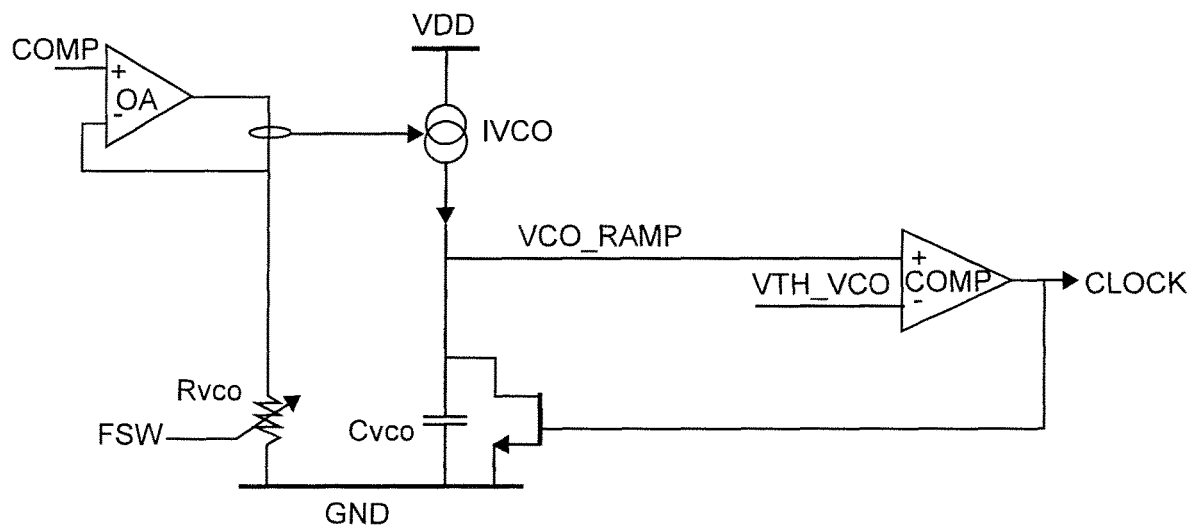

A voltage controlled oscillator (VCO) approach has also been proposed; a generalized architecture for which is schematically illustrated in FIGS. 23 and 24. In this approach, the compensator output, $V_c$ controls a VCO to generate clock pulses which initiate the fixed on-time pulses for COT control. When the output voltage falls and $V_c$ rises at a load transient, the switching frequency is increased as in the single phase embodiment described above. However, since a VCO is provided for each phase, pulses in respective phases can also overlap naturally. The disadvantage of this VCO approach is that it requires a complex compensation network since it relies on voltage mode control rather than current mode control.

Figure 25:
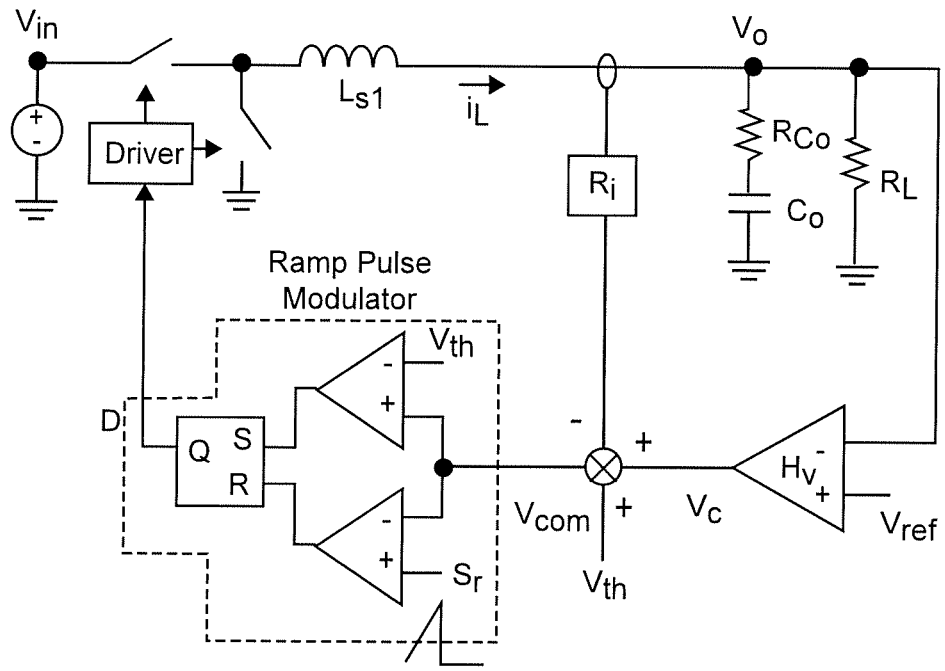
FIGS. 25, 26, 27 and 28 illustrate a control scheme, operational waveforms and step-up and step-down load transient response of a ramp pulse modulation (RPM) control mode DC-DC power converter.
Figure 26:
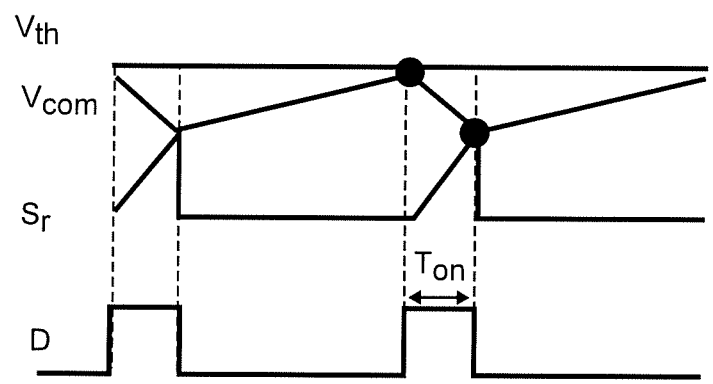

It is also known in current mode control power converters to provide for both variable on-time and variable off-time which also necessarily provides for variable frequency operation. One popular arrangement of this type is referred to as ramp pulse modulation (RPM) in which the beginning of $T_{on}$ is determined by a voltage threshold, $V_{th}$, compared to a $V_{com}$ signal which is the difference between $V_c$ and $i_L*R_i$ and the end of $T_{on}$ is determined by comparison of $V_{com}$ with $S_r$. $S_r$ is the same as the ramp slope determined by $V_{cap}$ in FIG. 4, as discussed above, and can be derived in the same manner and with the same preferred circuit. A generalized arrangement for such RPM control is schematically illustrated in FIG. 25 and the steady-state waveforms are shown in FIG. 26. While the steady-state behavior of RPM control is somewhat similar to COT control although the on-time is not fixed, the most significant differences appear in the transient response.

Figure 27:
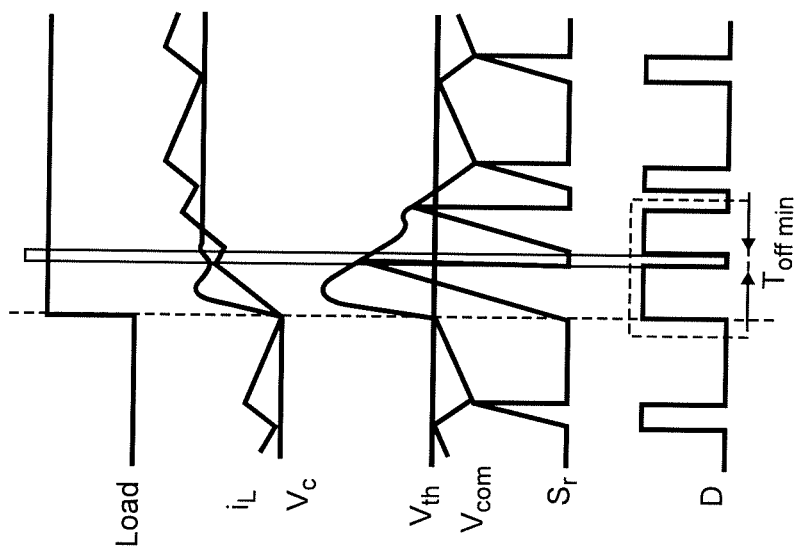

The step-up-load transient response illustrated in FIG. 27, it is seen that $V_{com}$ rises rapidly and crosses $V_{th}$ almost immediately when the load step-up transient occurs and diminishes more slowly thereafter requiring additional time for $S_r$ to increase to meet the increased $V_{com}$, thus extending pulses D (separated by a $T_{off\_min}$). However, for large step-up load transients, several switching cycles may be required to again reach steady state operation and, in such a case, the load transient response will occur in steps and be less than optimally rapid and a degree of undershoot will occur.

Figure 28:
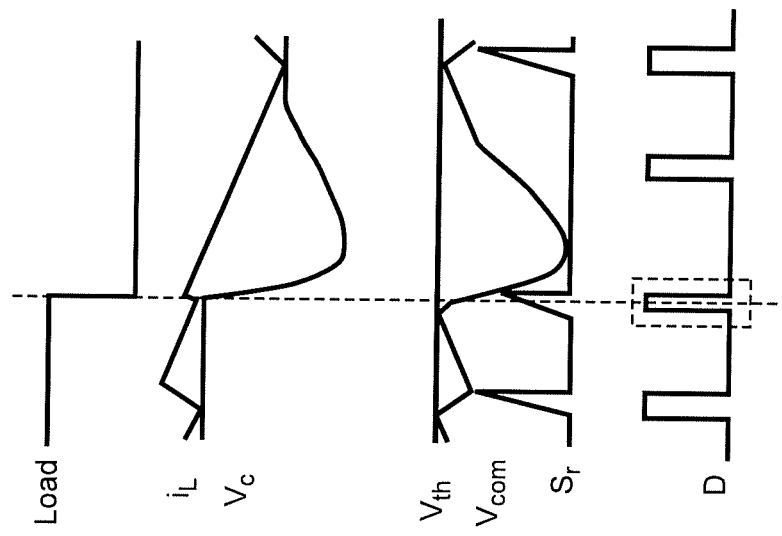
Figure 29:
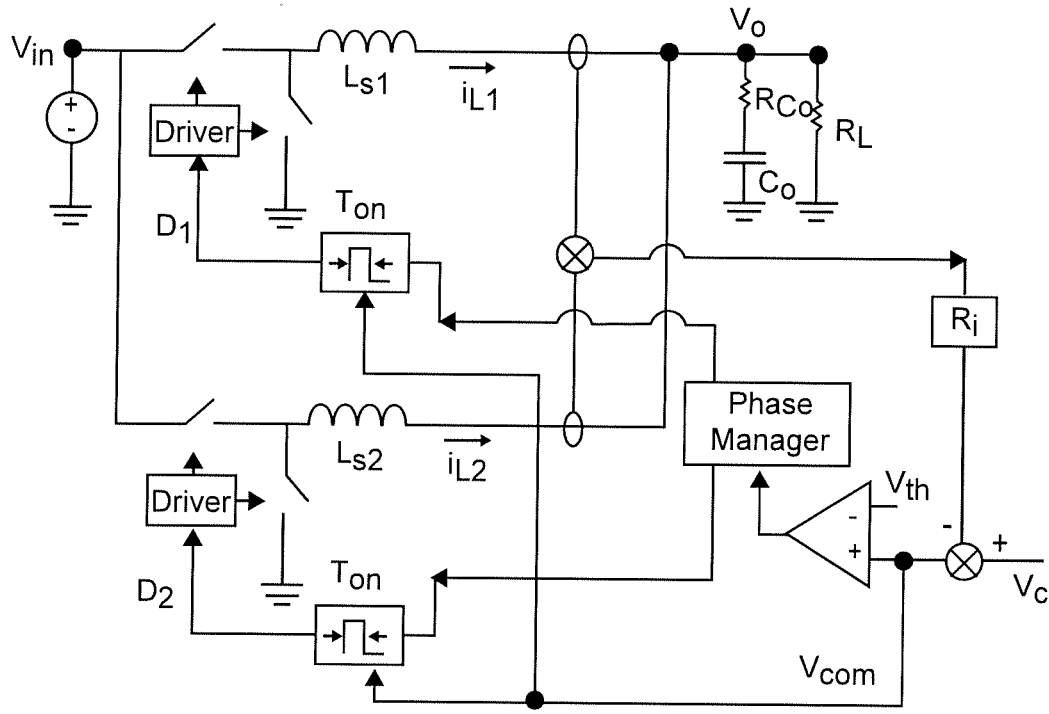
FIGS. 29 and 30 illustrate limitations of RPM control in DC-Dc converters.
Figure 30:
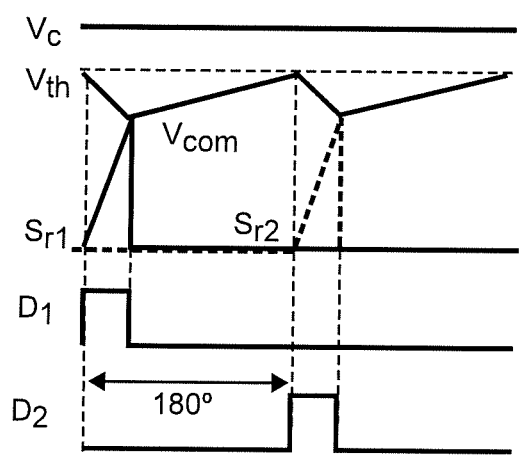

In the step-down load transient, the waveforms for which are shown in FIG. 28, $V_{com}$ falls rapidly and $S_r$ can rise to equal $V_{com}$ in a shorter period of time. Therefore, unlike COT control, RPM control can terminate a switching pulse, D, immediately upon the onset of a step-down transient to minimize the excess charge delivered to the output/filter capacitor, (Co and its equivalent series resistance (ESR) Rco) as discussed above in connection with FIG. 8. However, while a pulse D can be truncated, that truncation may be delayed by comparator slew rate and signal propagation time, allowing a degree of overshoot to occur FIG. 29 schematically illustrates a generalized architecture for applying RPM control to a multi-phase power converter and FIG. 30 illustrates the steady-state waveforms. It will be appreciated from these Figures and the above discussion of single phase RPM control that the same problems of pulse train saturation, overlapping and inductor current ripple cancellation effects.

Figure 31:
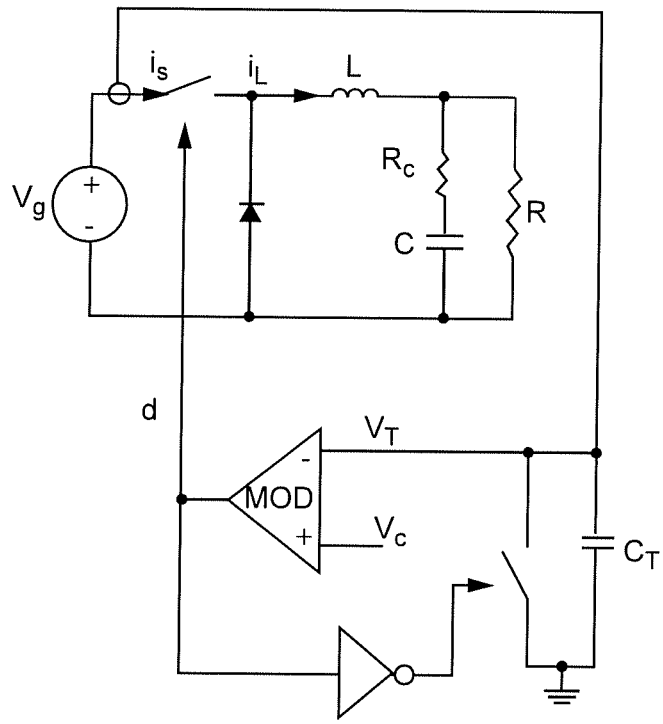
FIGS. 31 and 32 illustrate basic principles of inverse charge current mode (IQCM) control in accordance with the invention, FIG. 33 schematically illustrates an IQCM arrangement applied to a COT power converter.
Figure 32:
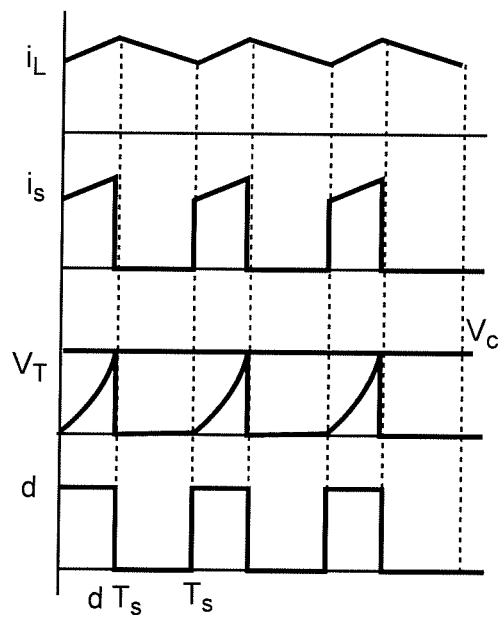

A current mode charge control has been proposed for power factor correction (PFC) and battery charger application; the basic architecture of which is schematically illustrated in FIG. 31 and its steady-state waveforms are illustrated in FIG. 32. In FIG. 31, it can be clearly seen that the input current is first integrated by charging a capacitor and the comparing the voltage developed on the capacitor to $V_c$, derived as discussed above. In this way the charge coming from the input power supply is controlled in each cycle. The advantage of charge control is that the control is less sensitive to noise since inductor current noise is filtered out by the charge control capacitor. However, this charge control arrangement is used in a fixed frequency arrangement and is intended for applications (e.g. battery charging) where large load transients are rare or absent altogether. Therefore the disadvantages of poor small signal property due to the double pole at half the switching frequency and the quality factor (Q) is a function of the load (unlike the peak current mode control discussed above) and the difficulty of achieving stability over a large load range is of less consequence and tolerable for some applications.

In sharp contrast with all of the current mode control arrangements and variants thereon as well as the problems thereof and the additional problems engendered by partial solutions therefor, the invention provides a new methodology for current mode control in which, instead of determining switching points when $i_L$ and $V_c$ are equal, switching pulses are initiated when the separation/distance of $i_{sum}*R_i$ and $V_c$ reaches a predetermined value. This predetermined value is determined by a charge control process where the difference between $i_{sum}*R_i$ and $V_c$ is used to charge a capacitor and then the capacitor voltage is compared to a predefined threshold voltage. This basic principle of operation is referred to as inverse charge current mode (IQCM) control. In this nomenclature the term "inverse" connotes that the difference between $i_{sum}*R_i$ and $V_c$ (e.g. In sharp contrast with all of the current mode control arrangements and variants thereon as well as the problems thereof and the additional problems engendered by partial solutions therefor, the invention provides a new methodology for current mode control in which, instead of determining switching points when $i_L$ and $V_c$ are equal, switching pulses are initiated when the separation/distance of $i_{sum}*R_i$ and $V_c$ reaches a predetermined value. This predetermined value is determined by a charge control process where the difference between $i_{sum}*R_i$ and $V_c$ is used to charge a capacitor and then the capacitor voltage is compared to a predefined threshold voltage. This basic principle of operation is referred to as inverse charge current mode (IQCM) mode control. In this nomenclature the term "inverse" connotes that the difference between $i_{sum}*R_i$ and $V_c$ (e.g. In sharp contrast with all of the current mode control arrangements and variants thereon as well as the problems thereof and the additional problems engendered by partial solutions therefor, the invention provides a new methodology for current mode control in which, instead of determining switching points when $i_L$ and $V_c$ are equal, switching pulses are initiated when the separation/distance of $i_{sum}*R_i$ and $V_c$ reaches a predetermined value. This predetermined value is determined by a charge control process where the difference between $i_{sum}*R_i$ and $V_c$ is used to charge a capacitor and then the capacitor voltage is compared to a predefined threshold voltage. This basic principle of operation is referred to as inverse charge current mode (IQCM) mode control. In this nomenclature the term "inverse" connotes that the difference between $i_{sum}*R_i$ and $V_c$ (e.g. $V_c-i_L*R_i$ with the measured inductor current signal being subtracted) and not the inductor current, itself, or some other parameter which controls the rate of capacitor charging. This concept can be applied to any of the types (e.g. COT, AOT RPM and the like of single or multiple phases) of current mode control discussed above.

Figure 33:
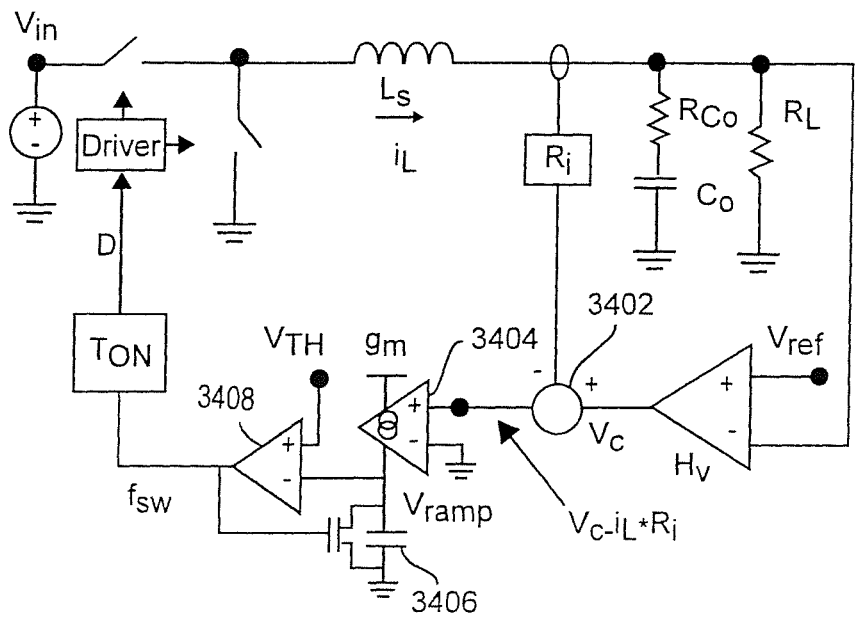
Figure 34:
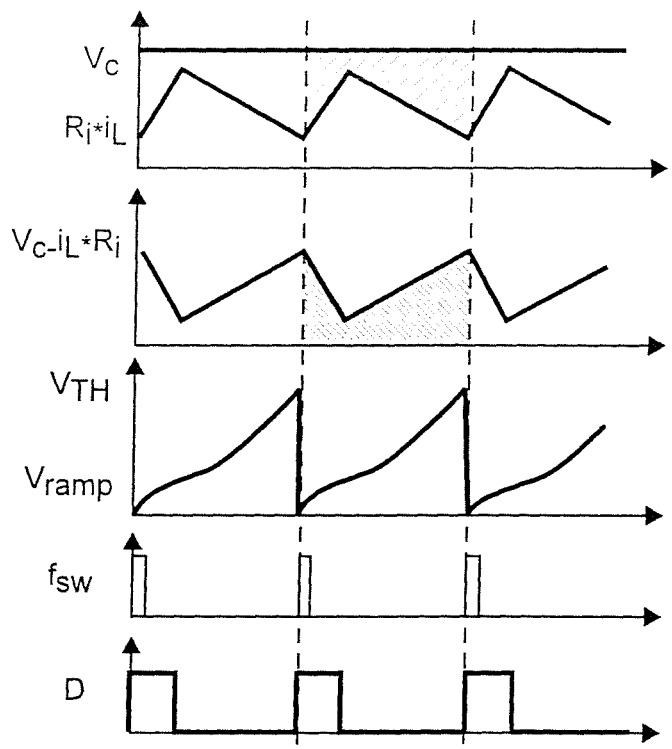
FIGS. 34 and 35 illustrate waveforms of steady-state and step-up transient performance of the circuit of FIG. 33, FIGS. 36 and 38 illustrate a circuit and operation of a $T_{on}$ generator suitable for use with the invention.

For example, an architecture applying IQCM control to a COT (referred to as inverse charge constant on-time (IQ-COT)) power converter is schematically shown in FIG. 33 and its steady-state waveforms are illustrated in FIG. 34. The difference between $i_L*R_i$ and $V_c$ is determined at adder 3402 where $i_L*R_i$ is applied to a negative input (thus functioning as a subtractor) and a signal representing the difference is applied to a transconductance amplifier 3404 to provide a current proportional thereto. The current thus provided by the transconductance amplifier is used to charge capacitor 3406 and the voltage developed as capacitor 3406 is charged is compared with a threshold voltage at comparator 3408 to enable a $T_{on}$ generator and discharge/reset of capacitor 3406. Note that during the off-time when $i_L$ is falling, the value of $V_c-i_L*R_i$ is increasing and the slope of $V_{ramp}$ is increasing and when $V_{ramp}$ equals $V_{th}$ the off-time ends and a constant duration pulse D is generated. In FIG. 34, $i_L*R_i$ is shown below $V_c$ while $i_L*R_i$ can overlap with $V_c$, If higher $G_m$ is applied than the very small area of $V_c-i_L*R_i$, it can generate enough ramp to generate D, in which case, $i_L*R_i$ will overlap with $V_c$.

Figure 35:
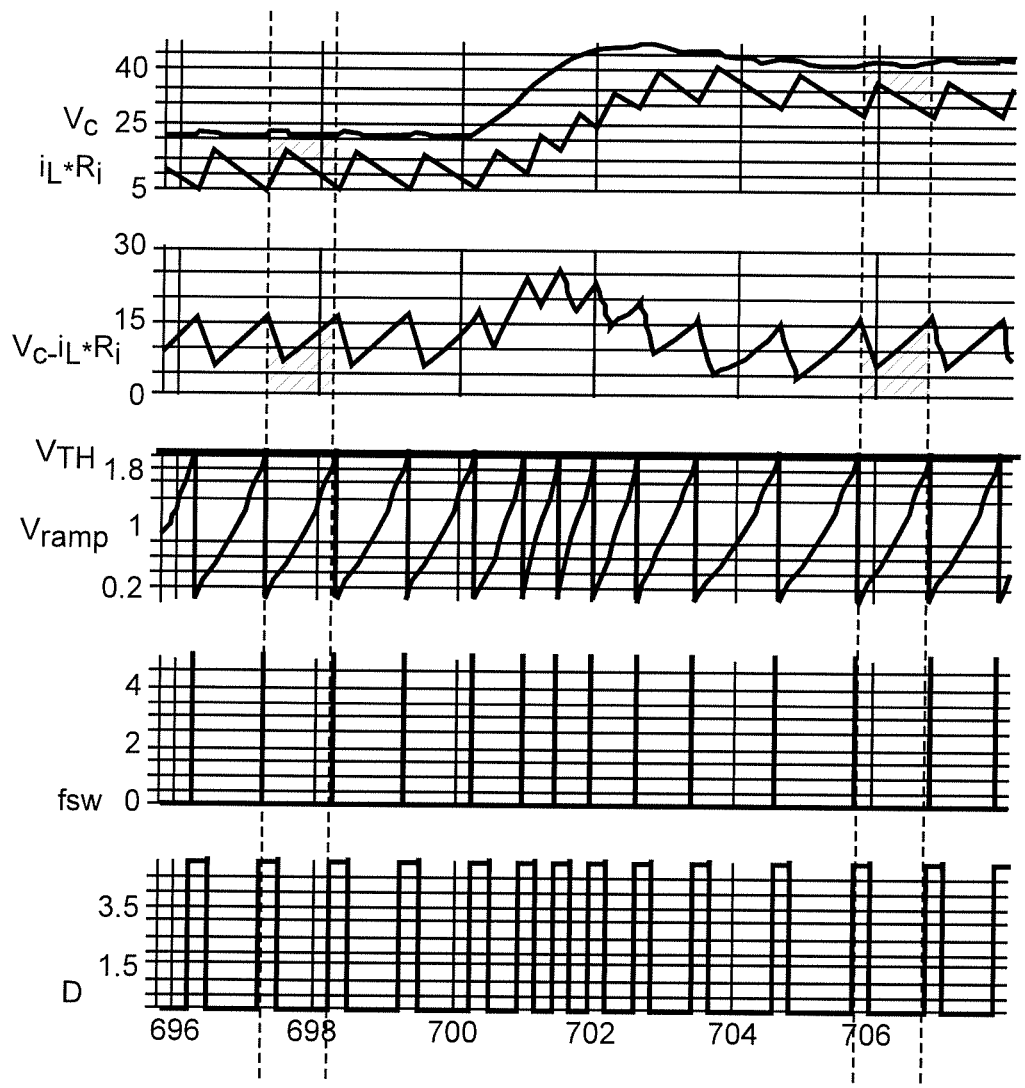

The load transient response waveforms are illustrated in FIG. 35 with the shaded areas indicating the difference $V_c-i_L*R_i$ at different loads. Note that at different loads $V_{th}$ is fixed and thus, in any given switching cycle, the charge on capacitor 3406 at the switching instant is fixed. Therefore, the difference $V_c-i_L*R_i$ at the switching instant is constant at different loads and $i_L$ will always follow $V_c$ as is a prerequisite (by definition) for any current mode control arrangement. From FIG. 35, it can also be seen that if $i_L$ cannot follow $V_c$ properly in a single cycle, the distance between $f_{sw}$ pulses become closer more rapidly than with prior current mode control arrangements and, consequently, $i_L$ can follow $V_c$ more closely even when the transition to new steady-state operation is performed in steps.

Figure 36:
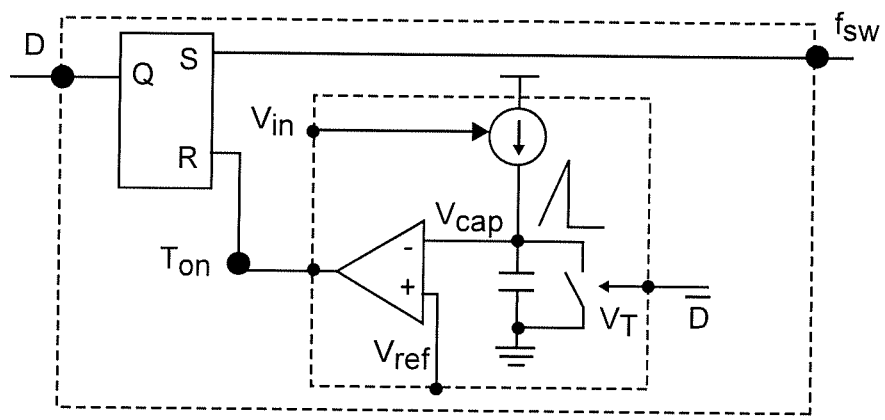
Figure 37:
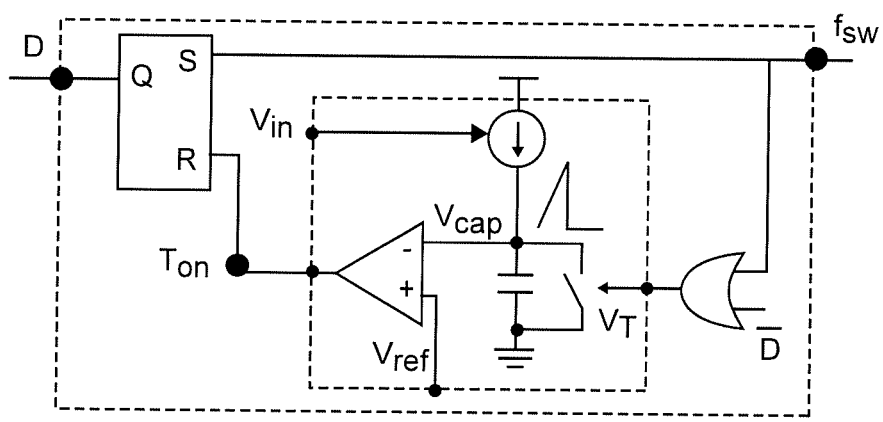
FIGS. 37 and 39 illustrate a circuit and operation of a $T_{on}$ generator suitable for use with the invention and having a pulse merging capability.
Figure 39:
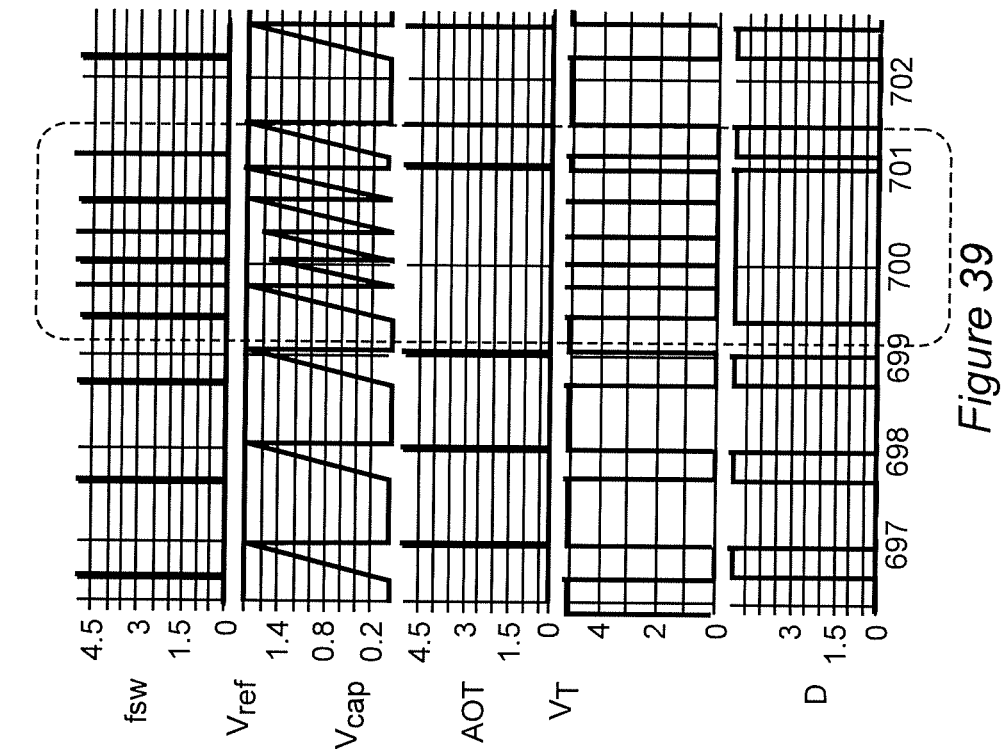
Figure 38:
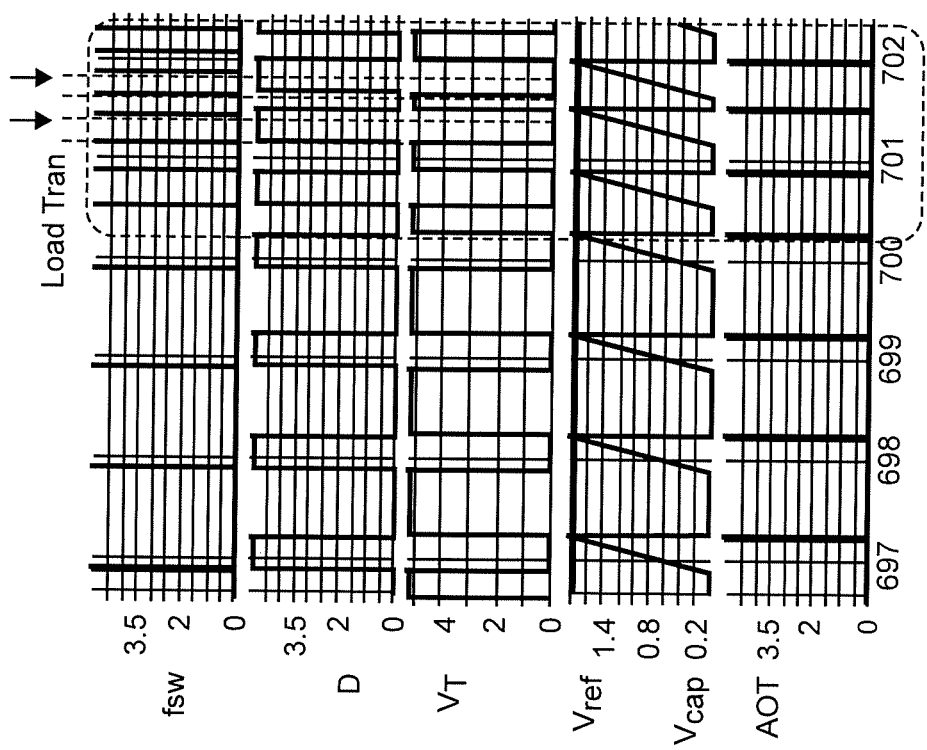

It will be noted that the $T_{on}$ generator is schematically depicted in FIG. 33. A suitable circuit for the purpose is schematically illustrated in FIG. 36 which is basically the same as that illustrated in FIGS. 4 and 6. As a perfecting feature of the invention an alternative $T_{on}$ generator is schematically illustrated in FIG. 37. Unlike the inductor current ripple based COT arrangement discussed above, in the IQCOT arrangement of FIG. 33 $f_{sw}$ pulses can occur before the end of an on-time. Thus, adding an OR gate allows the capacitor to be reset by either an inverse of the pulse D or an $f_{sw}$ pulse so that on-time pulses D can be merged together without a minimum off-time between them, increasing the rate at which inductor current can rise and reducing the time to resumption of steady-state operation. FIGS. 38 and 39 illustrate the different transient responses of the $T_{on}$ generators of FIGS. 36 and 37, respectively, particularly showing the merging of the D pulses. This allows the load transient response to not only be accelerated but confined to essentially a single continuous on-time pulse, even if that pulse is required to span more than one switching period. Note also from FIG. 39 that steady-stare operation can be resumed almost immediately after a single minimum off-time period.

Figure 41:
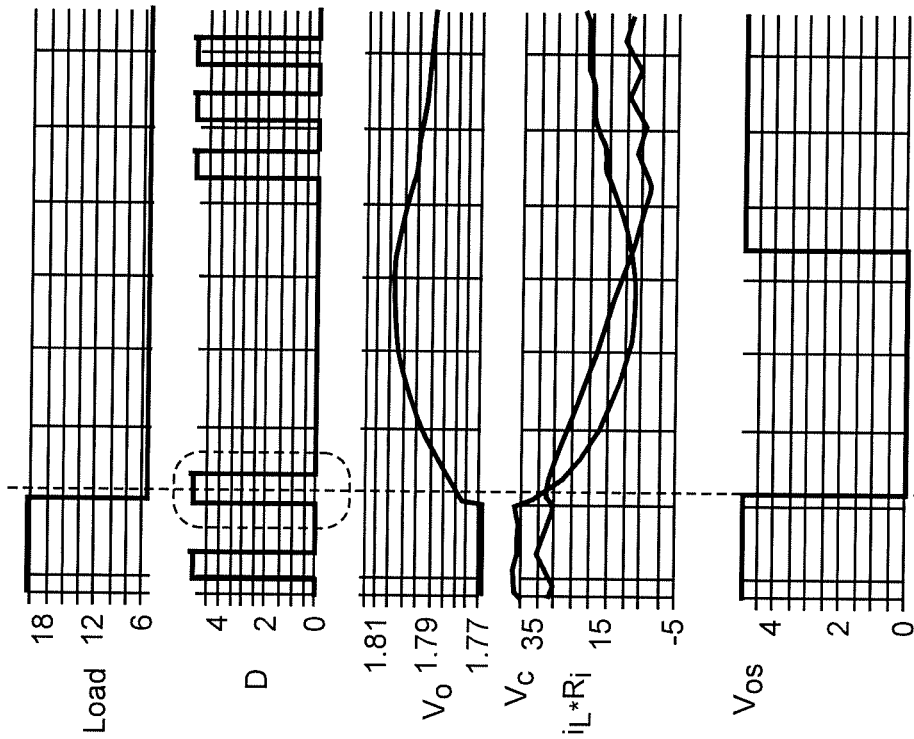
FIGS. 40 and 41 illustrate a perfecting feature of the invention providing overshoot reduction using IQCM control.
Figure 40:
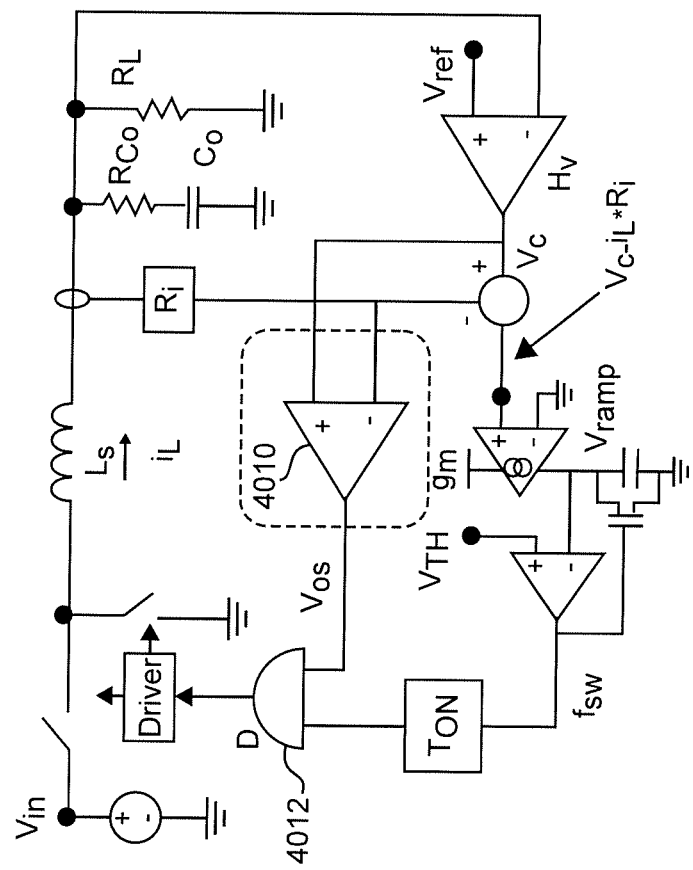

As another perfecting feature of the IQCOT arrangement of FIG. 34, the development of $V_c-i_L*R_i$ also provides signals that can provide a very simple arrangement for decreasing overshoot during step-down transients. A preferred architecture of such a perfecting feature is schematically illustrated in FIG. 40 and waveforms of the step-down load transient response are shown in FIG. 41. Essentially, $V_c$ and $i_L*R_i$ can be directly compared at comparator 4010 and the output logically ANDed with the output of the $T_{on}$ generator to truncate a pulse D, if active, and suppress any further pulses D until $V_c$ again exceeds $i_L*R_i$.

Figure 42:
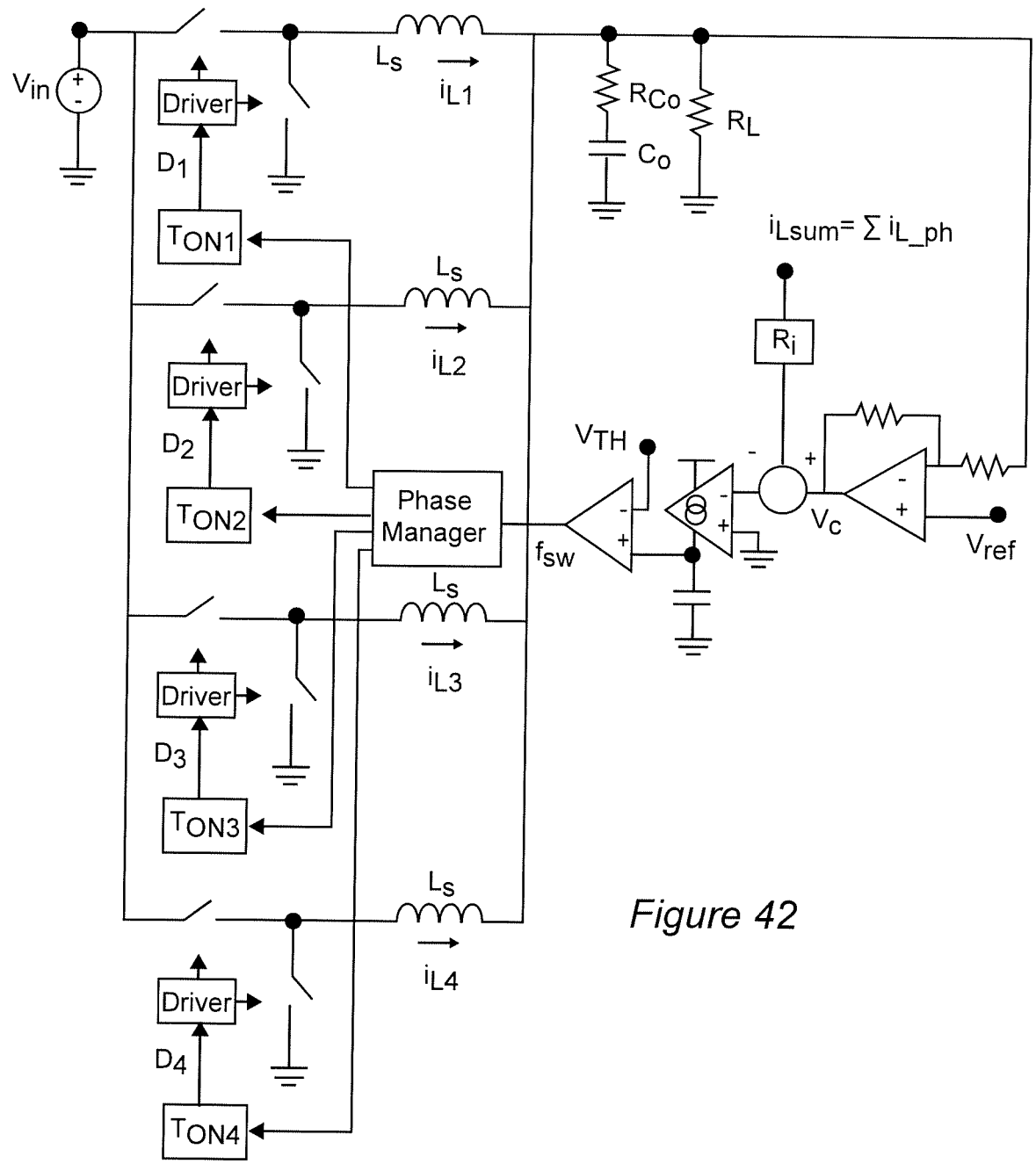
FIGS. 42, 43A and 43B illustrate application of the invention to multi-phase operation and key waveforms thereof.
Figures 43A, 43B:
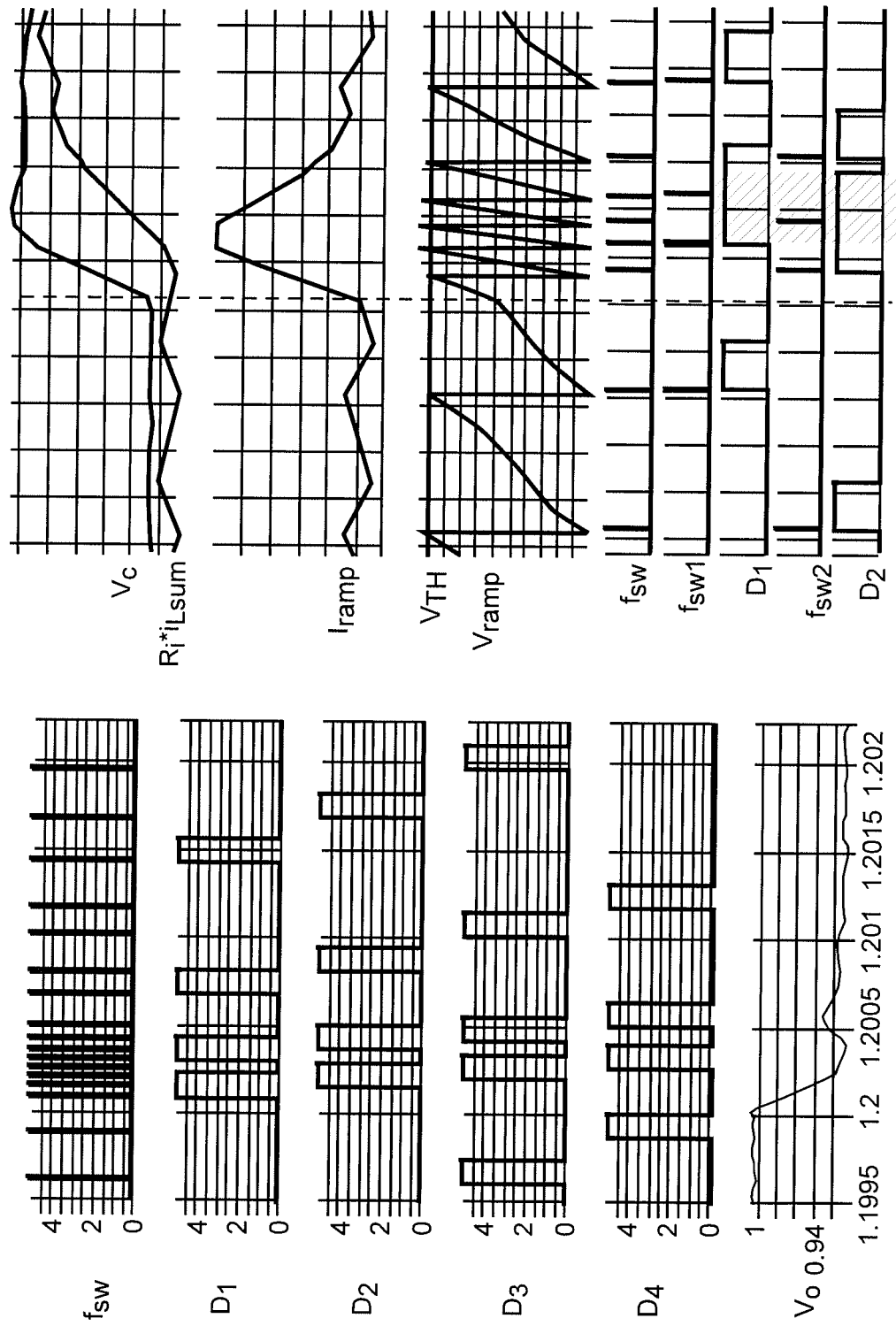

Application of IQCOT to multi-phase operation is schematically illustrated in FIG. 42 and the step-up load transient response waveforms are illustrated in FIGS. 43A and 43B. In this embodiment of the invention, all the measured inductor currents are summed to produce a signal, $i_{sum}$, as discussed above although the inductor current sensors have been deleted from FIG. 42 for clarity. It can be seen from FIG. 43 that $f_{sw}$ increases more rapidly than inductor ripple based COT power converters as is characteristic of IQCOT power converters and the D1-D4 pulses naturally overlap to yield a very short step-up load transient response and very brief and reduced magnitude undershoot if not effectively suppressing undershoot altogether since the degree of overlapping is, itself, proportional to output undershoot.

Figure 44A:
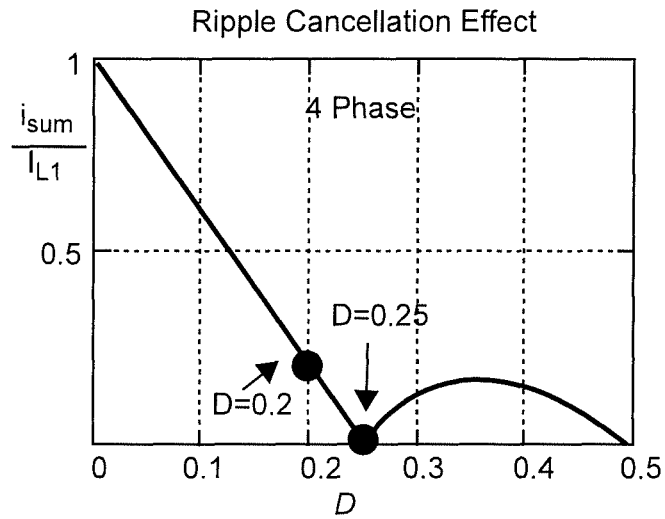
FIGS. 44A, 44B and 44C illustrate improvement of noise sensitivity close to ripple cancellation points in a multi-phase converter in accordance with the invention.
Figure 44C:
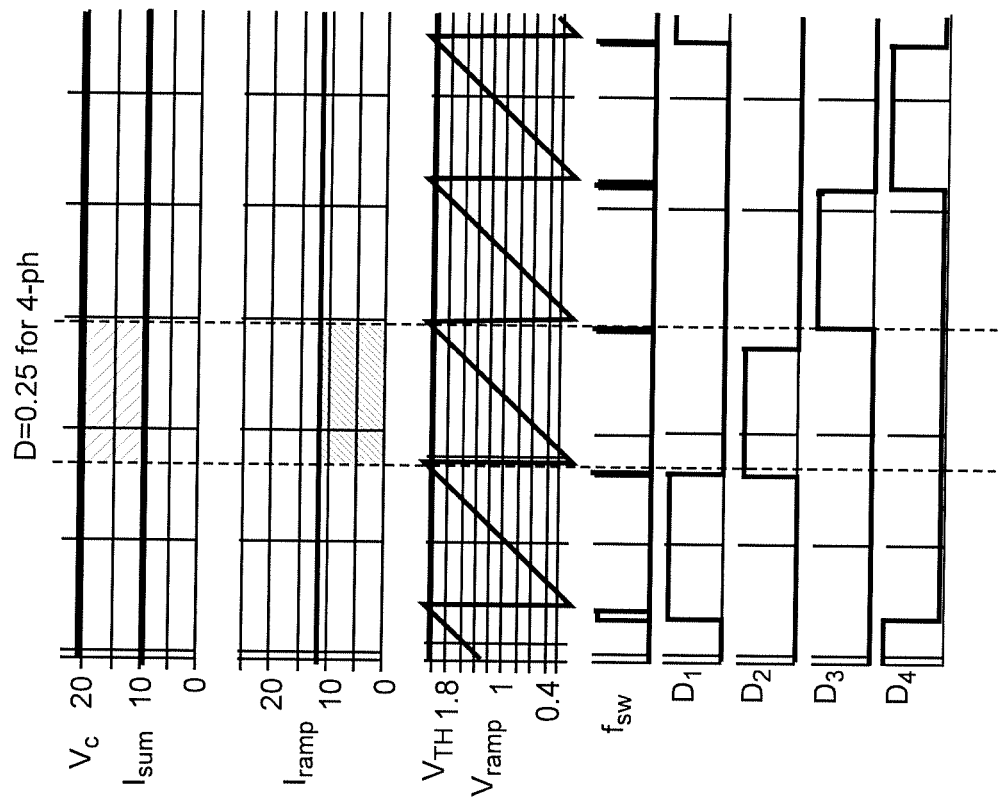
Figure 44B:
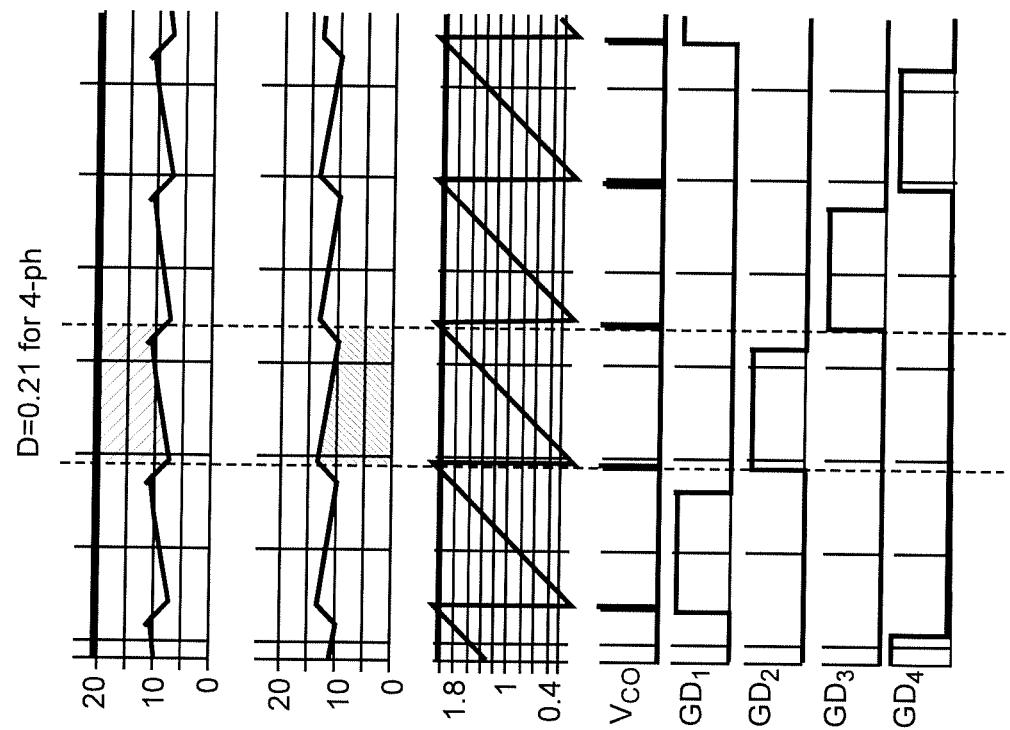

Another major advantage of IQCM control in multi-phase power converters and IQCOT controlled power converters in particular where switching frequency changes to alter duty cycle and, therefore, duty cycle can change unpredictably, is that the IQCM control is not based on inductor current ripple and thus is not susceptible to noise near ripple cancellation points, as discussed above. Rather, IQCM control is based on the $V_{ramp}$ signal which can be designed to have any desired amplitude to provide a good margin above anticipated or measured noise amplitude. For example, in the simulation waveforms of a four-phase IQCOT power converter illustrated in FIGS. 44B and 44C, (having a ripple cancellation point at D=0.25) operating at D=0.21, as illustrated in FIG. 44A, the ripple summation, $i_{sum}$, is only 3.5 mV while $f_{sw}$ is determined by $V_{ramp}$ and $V_{th}$ which, in this case, is 2.0V. Moreover, even at the ripple cancellation point of D=0.25 or D=0.5, where the summed inductor current ripple is zero, the converter will operate normally because $V_{ramp}$ can still be generated from the difference between $V_c$ and $i_L*R_i$ and no external ramp is required. Thus, complexity of optimizing an external ramp for different duty cycles is also avoided.

Figure 45:
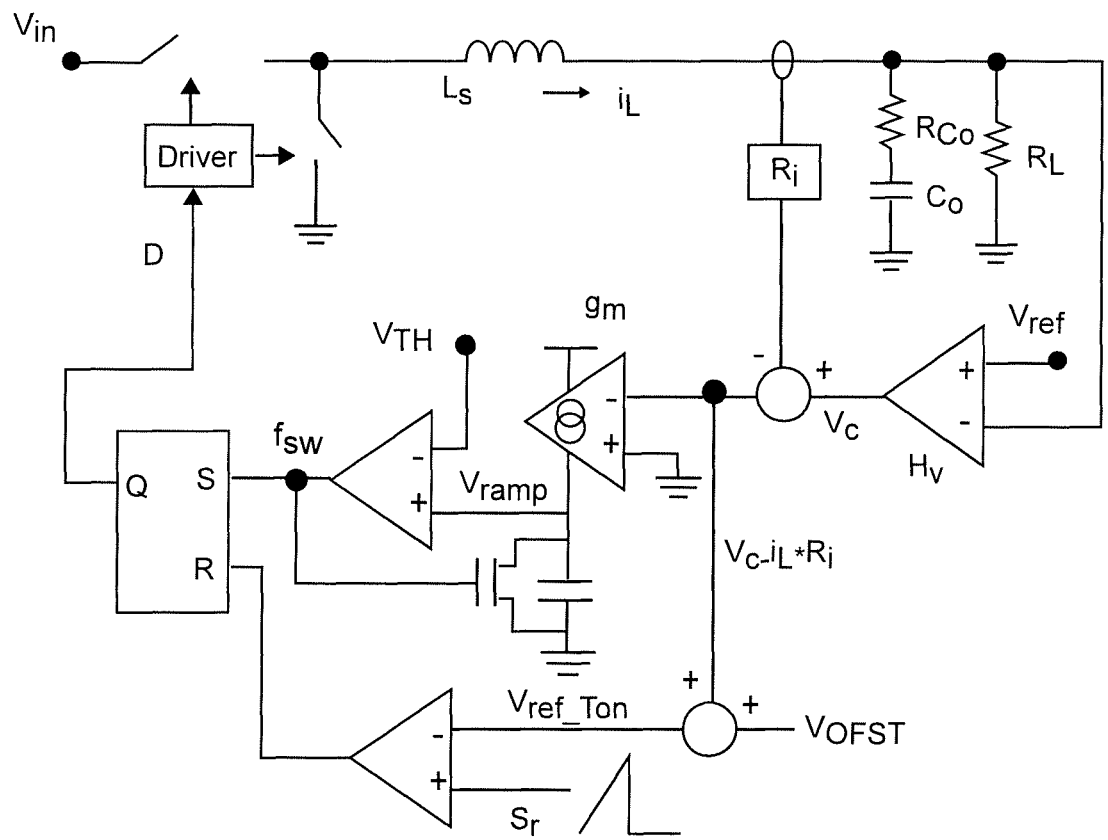
FIGS. 45 and 46 illustrate application of IQCM control to a variable on and off time DC-DC converter.
Figure 46:
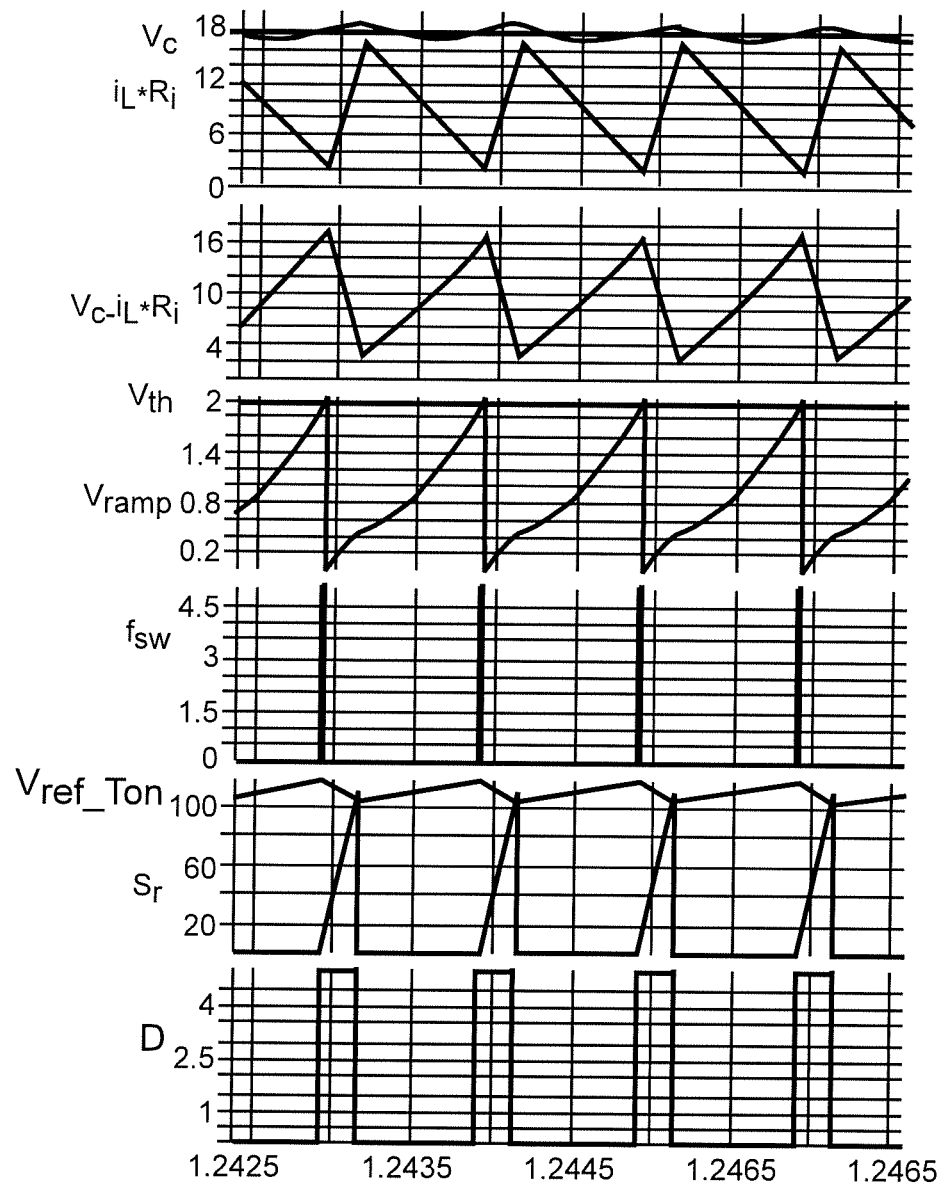

The IQCM concept also allows a variable on-time, variable off-time control for power converters not previously available in the art such as that illustrated schematically in FIG. 45. Essentially a variable on-time, variable off-time control functions somewhat similarly to and may be regarded as a counterpart of RPM control but providing for a ramp slope to be varied relative to a fixed threshold rather than a fixed slope ramp being compared with a variable voltage (e.g. $V_{com}$). Therefore, the term "ramp pulse modulation" is not considered to be accurately descriptive of variable on-time, variable off-time control although variable on-time, variable off-time is produced by RPM control. Operational waveforms of the architecture of FIG. 45 are illustrated in FIG. 46. The frequency of the duty cycle is determined by IQCM in the same manner as in IQCOT control while the end of the on-time pulses are determined by the fixed ramp, $S_r$, and $V_{ref\_Ton}$ which is proportional to $V_c-i_L*R_i$. $V_{OFST}$ is simply a DC offset to keep $V_{ref\_Ton}$ in the correct amplitude range but it could be a regulation voltage adjustment or a compensation for variation of fixed ramp slope or both. It also could provide a very simple, elegant and accurate way of providing voltage droop with load current.

Figure 47:
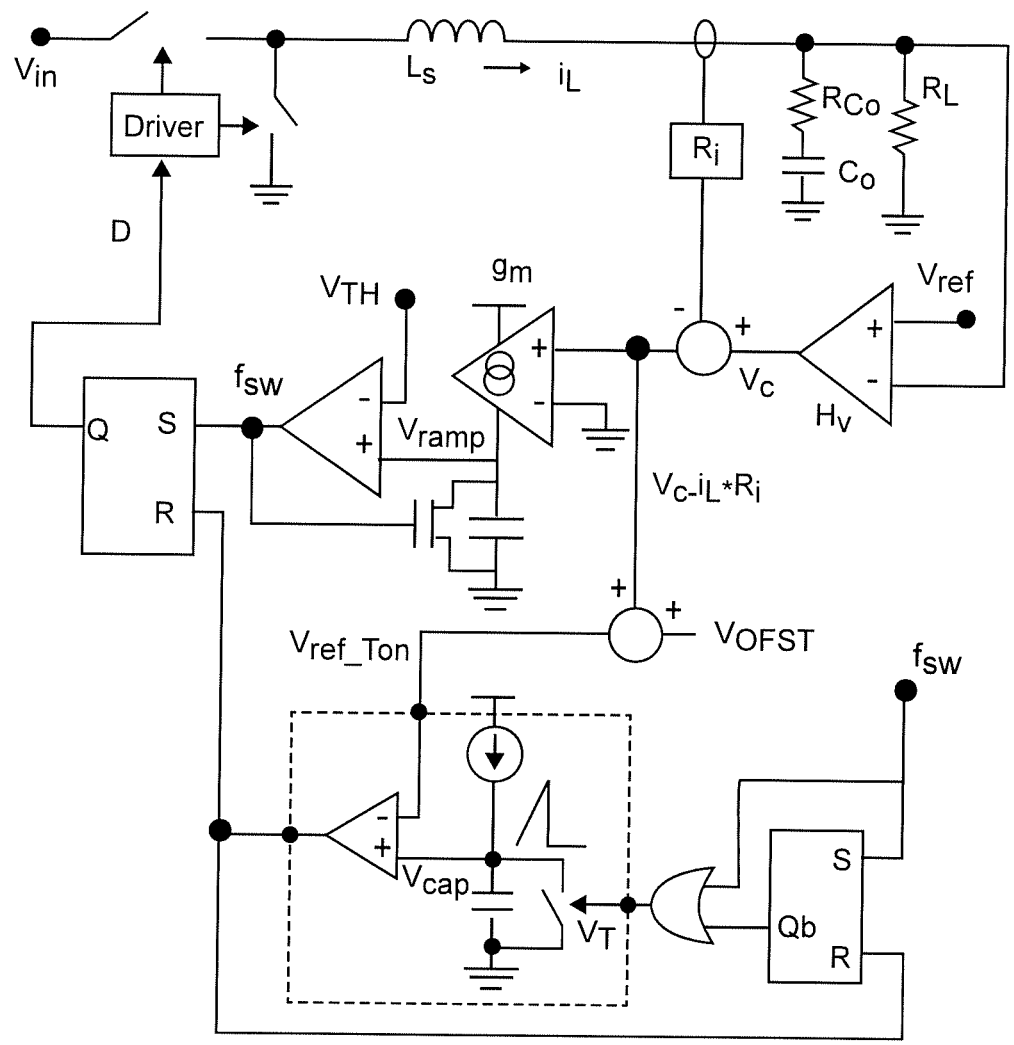
FIGS. 47 and 48 illustrate a preferred embodiment of the invention applied to a variable on and off time arrangement for single phase operation.
Figure 48:
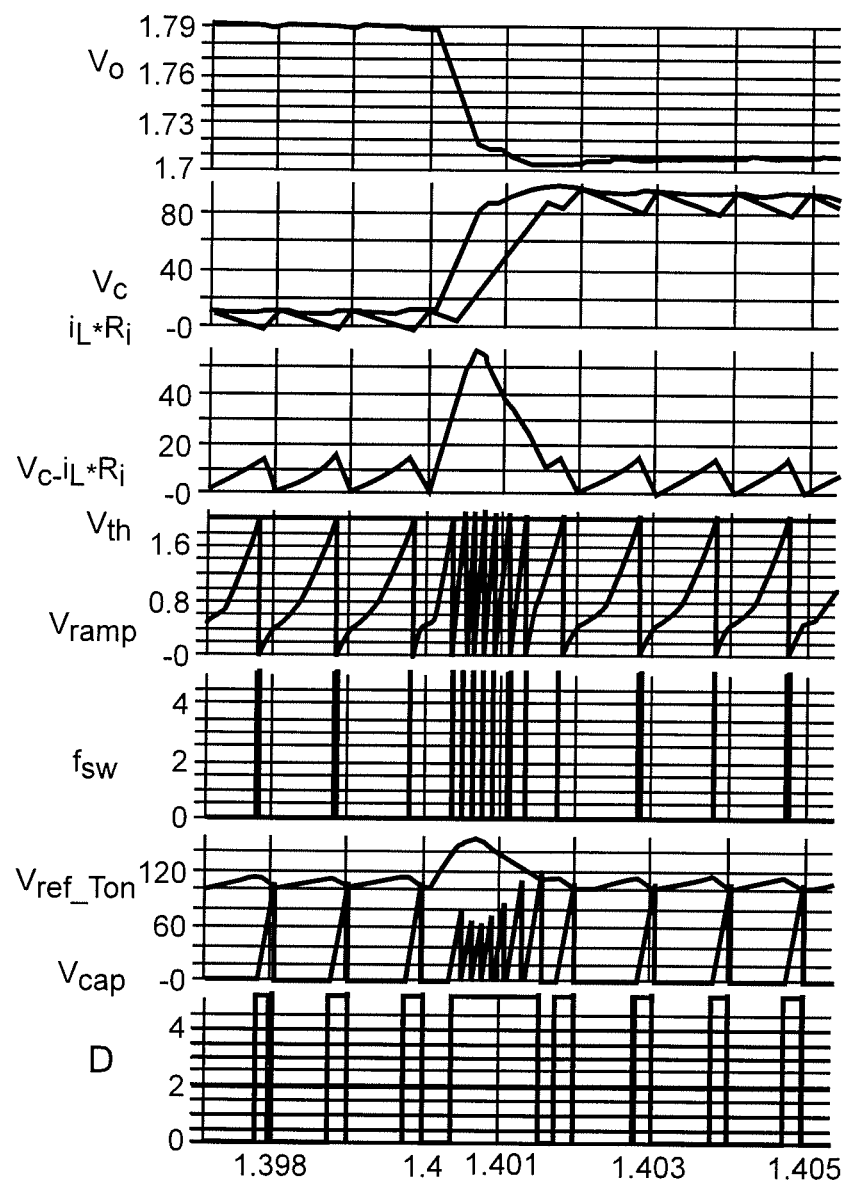

FIG. 47 shows a preferred architecture for the variable on-time, variable off-time control using the IQCM concept for a single phase power converter. Operational steady-state and transient waveforms are shown in FIG. 48. It should be noted that this arrangement solves the problem of large transient response described above in connection with RPM control. That is, this arrangement increases $f_{sw}$ in proportion to the load transient characteristic (e.g. load step or slew rate) and the pulses can be merged together by using the $T_{on}$ generator of FIG. 37, described above. As in the case of RPM control $T_{on}$ is already extended and merging of $T_{on}$ pulses can be done with lower gain (gm of the transconductance amplifier) of the feedback loop.

Figure 49:
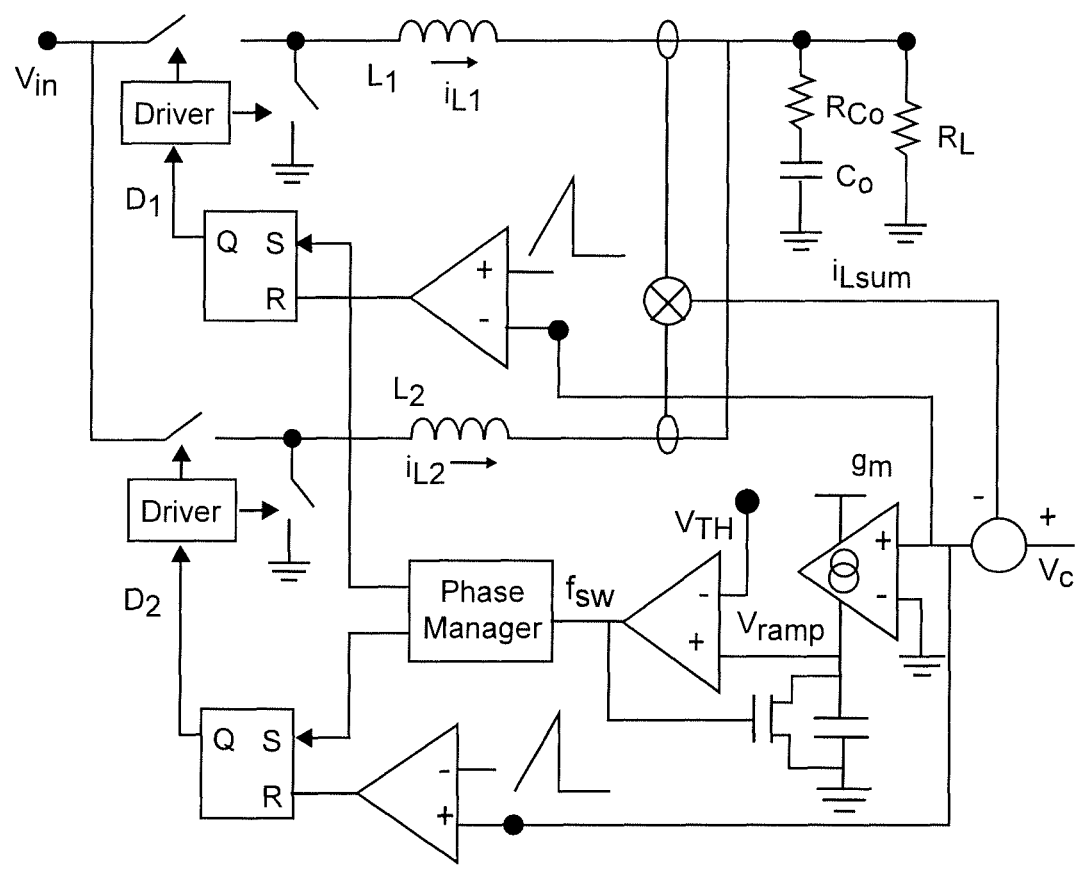
FIGS. 49 and 50 illustrate a preferred embodiment of the invention applied to a variable on and off time arrangement for multi-phase operation.
Figure 50:
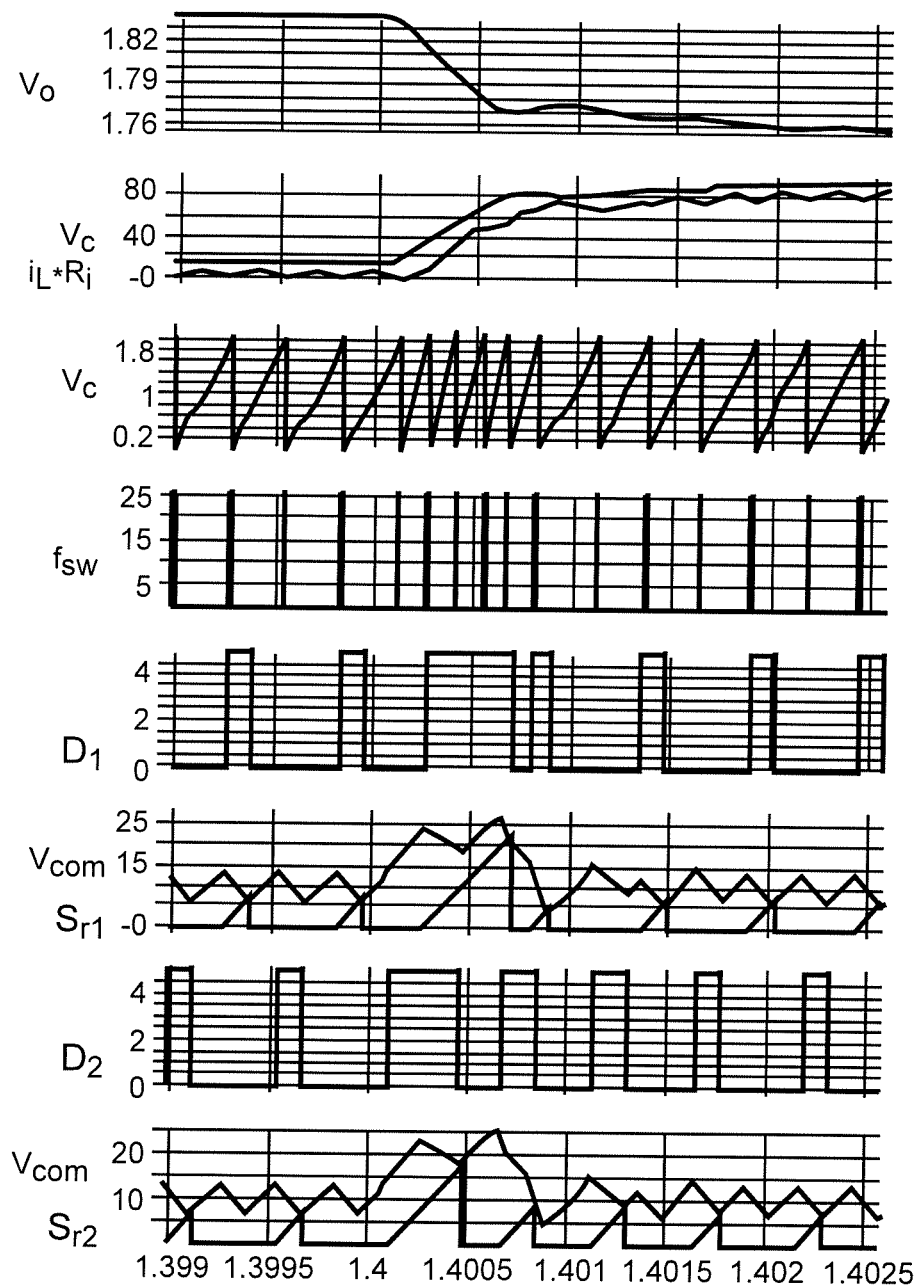

Application of variable on-time, variable off-time control using IQCM to multi-phase power converters is schematically illustrated in FIG. 49 with its operational steady-state and load transient waveforms illustrated in FIG. 50. From FIG. 50, it can be clearly seen that at a load transient, $f_{sw}$ increases very high and very quickly and, when the pulses are distributed, the pulses overlap linearly in proportion to the magnitude of the load transient characteristic (e.g. load step or slew rate). As with IQCOT control, this application to multiple phases is not inductor current ripple dependent and there are no noise susceptibility effects due to operation near a ripple cancellation point of the duty cycle, By the same token, no external ramp is required to achieve stability and freedom from phase jitter.

Figure 51:
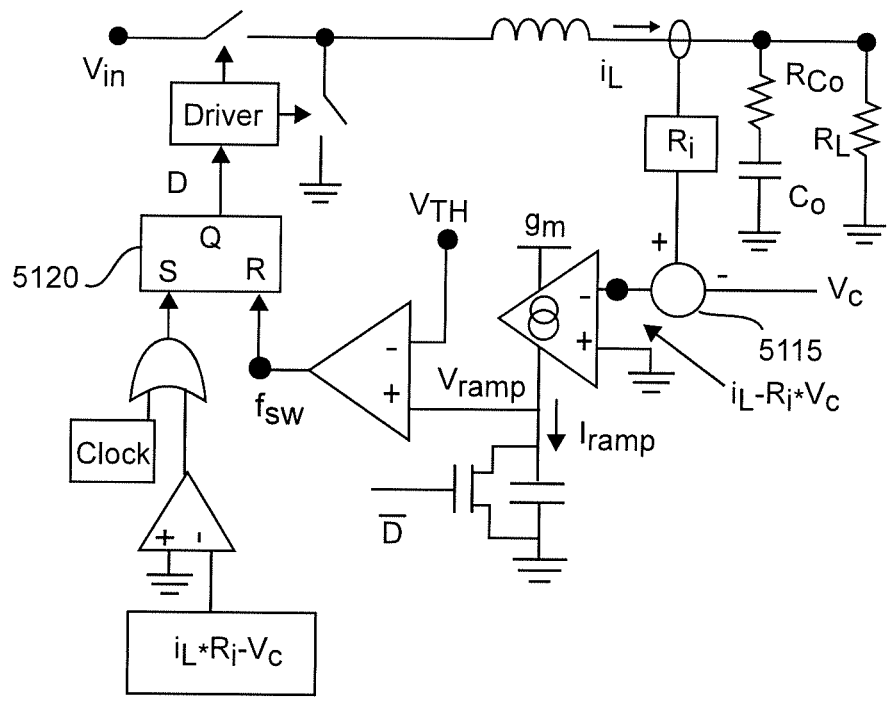
FIGS. 51, 52 and 53 illustrate a fixed frequency embodiment of the invention and its steady-state and transient response for single phase operation.
Figure 52:
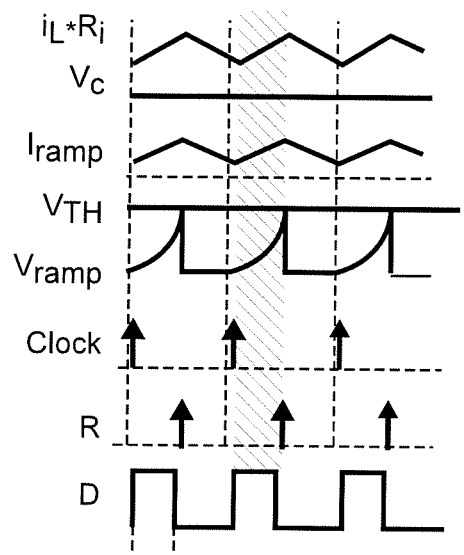
Figure 53:
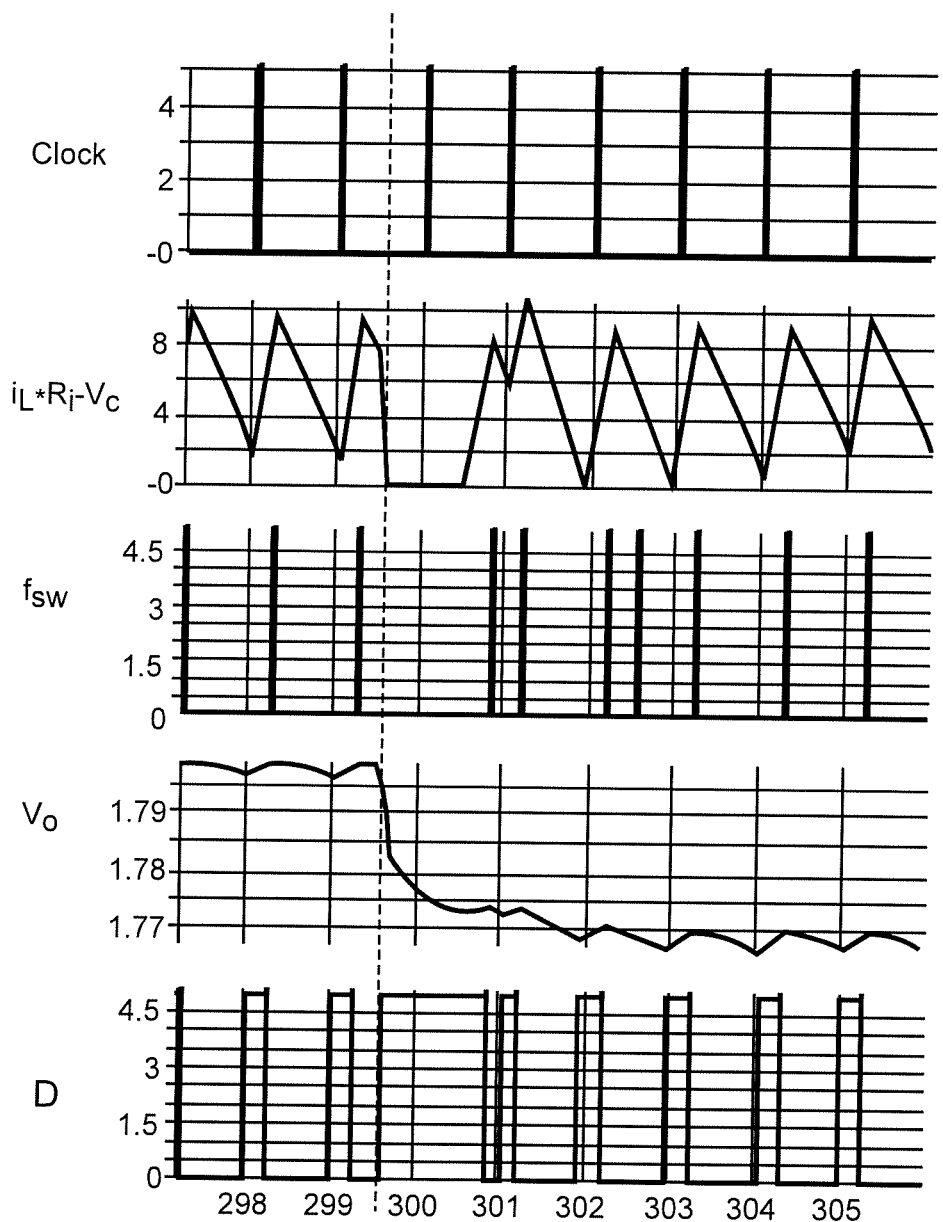
Figure 54:
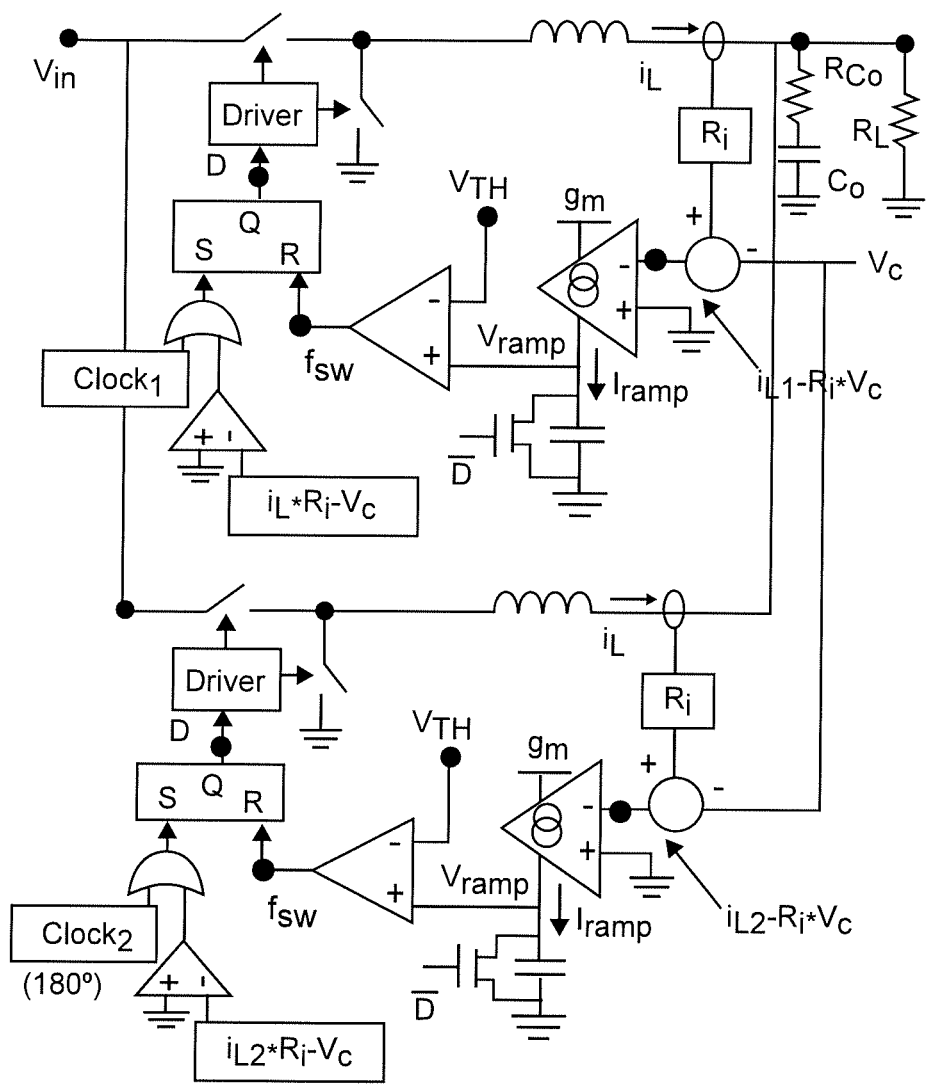
FIG. 54 illustrates a multi-phase fixed frequency embodiment of the invention.

The IQCM concept can also be extended to fixed frequency power converter operation. An exemplary architecture for doing so is illustrated in FIG. 51. Steady state operational waveforms are illustrated in FIG. 52 and load transient response waveforms are illustrated in FIG. 53. Note that, in this architecture, the polarity of inputs to adder 5110 are switched as compared with previously described embodiments and the resulting $i_L*R_i-V_c$ signal is applied to both the transconductance amplifier to obtain $I_{ramp}$ for charging a capacitor for resetting latch 5120 and to control an input to an OR gate receiving clock pulses for setting latch 5120. When a load step-up transient occurs, $i_L*R_i-V_c$ immediately falls to zero and overrides the clock signal to initiate a pulse to reduce undershoot. This type of arrangement can also be extended to multi-phase converters similarly to the exemplary two-phase embodiment shown in FIG. 54 and provides similar advantages over ripple based control.

Figure 55:
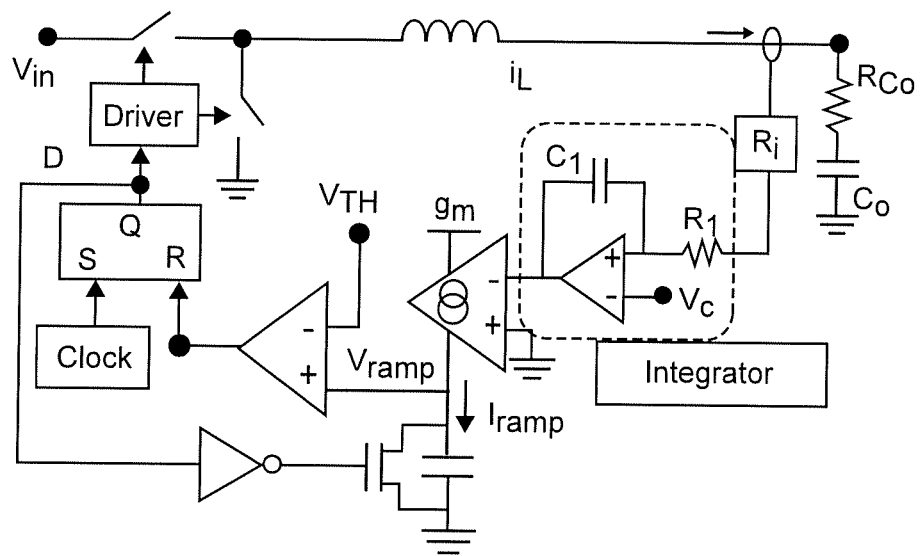
FIG. 55 illustrates a preferred embodiment of IQCM control for fixed frequency operation, and FIG. 56 illustrate a preferred IQCM control embodiment for variable frequency COT operation.
Figure 56:
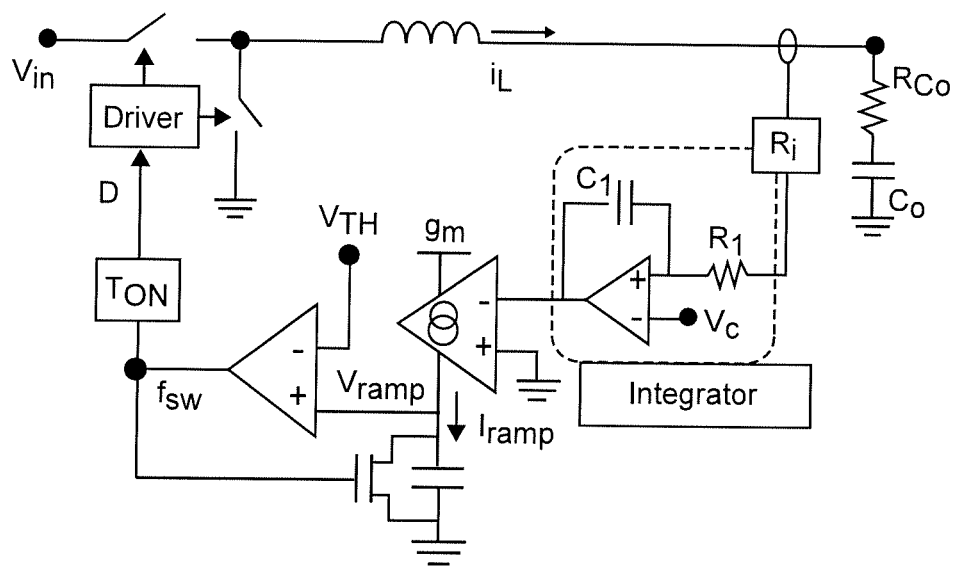

The IQCM control concept can also be readily extended to average current mode control with either fixed frequency operation, as shown in the exemplary embodiment schematically illustrated in FIG. 55 or variable frequency operation as shown in the exemplary embodiment shown in FIG. 56. As alluded to above, average current control is substantially the same as peak or valley current mode control but includes an integrator or low pass filter circuit in the inductor current feedback path to improve noise immunity and will thus be readily understood by those skilled in the art in view of the foregoing discussion of the invention.

In view of the foregoing, it is seen that the invention provides a universally applicable concept for control of current mode controlled power converters that avoids all the problems of inductor ripple based current mode control arrangements as well as problems engendered by partial solutions to those problems. The invention also allows substantial simplification and improved performance over inductor current ripple based control arrangements, particularly in multi-phase power converter applications.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A power converter comprising
   a pulse generator for generating pulses for controlling connection of said power converter to a power source,
   a circuit for developing a voltage corresponding to a difference between a voltage derived from output voltage of said power converter and a signal corresponding to inductor current of said power converter,
   a transconductance amplifier that develops a current proportional to said voltage corresponding to said difference between said voltage derived from output voltage and said signal corresponding to inductor current to charge a capacitor and thus develop a ramp signal, and a control circuit responsive to said ramp signal on said capacitor reaching a threshold for controlling said pulse generator.

2. The power converter as recited in claim 1, wherein said pulse generator comprises a current source, a capacitor in series with said current source, a comparator for comparing a voltage developed on said capacitor with a threshold, a latch that is set in response to said control circuit and reset in response to said comparator, and a capacitor discharge switch responsive to said pulse generator connected in parallel with said capacitor.

3. The power converter as recited in claim 2, further comprising a circuit for adding an offset voltage to said difference between said voltage derived from output voltage and said signal corresponding to said inductor current, and wherein said control circuit further comprises a further circuit for developing a voltage corresponding to a difference between voltage derived from output voltage and said voltage corresponding to inductor current of said power converter, a further transconductance amplifier for developing a current proportional to said difference between said voltage derived from output voltage and said voltage corresponding to inductor current for charging a further capacitor, and a further control circuit responsive to a voltage on said further capacitor reaching a threshold for setting said latch.

4. The power converter as recited in claim 3, further including a plurality of said pulse generators, a plurality of said latches, a phase manager for distributing an output of said control circuit for setting each of said plurality of latches, and a plurality of comparators for comparing a signal representing a difference between said voltage derived from output voltage of said converter and a signal representing inductor current with a ramp voltage for resetting each of said plurality of latches.

5. The power converter as recited in claim 2, further including a logic circuit responsive to a clock for gating a signal to set said latch.

6. The power converter as recited in claim 1, wherein said pulse generator comprises a current source, a capacitor in series with said current source, a comparator for comparing a voltage developed on said capacitor with a threshold, a bistable latch that is set in response to said control circuit and reset in response to said comparator, a capacitor discharge switch responsive to said pulse generator connected in parallel with said capacitor, and a logic circuit responsive to an output of said latch and an output of said comparator for controlling said capacitor discharge switch.

7. The power converter as recited in claim 1, further comprising a comparator responsive to said voltage derived from output voltage and a signal representing said inductor current for disabling said pulse generator when said signal representing said inductor current exceeds said voltage derived from said output voltage.

8. The power converter as recited in claim 1, further comprising a plurality of said pulse generators, and a phase manager for distributing an output of said control circuit.

9. The power converter as recited in claim 8, wherein said each of said plurality of pulse generators comprises a current source, a capacitor in series with said current source, a comparator for comparing a voltage developed on said capacitor with a threshold, a bistable latch that is set in response to said control circuit and reset in response to said comparator, and a capacitor discharge switch responsive to said pulse generator connected in parallel with said capacitor.

10. The power converter as recited in claim 8, wherein each of said plurality of said pulse generators comprises a current source, a capacitor in series with said current source, a comparator for comparing a voltage developed on said capacitor with a threshold, a bistable latch that is set in response to said control circuit and reset in response to said comparator, a capacitor discharge switch responsive to said pulse generator connected in parallel with said capacitor, and a logic circuit responsive to an output of said latch and an output of said comparator for controlling said capacitor discharge switch.

11. The power converter as recited in claim 8, further comprising a comparator responsive to said voltage derived from output voltage and a signal representing said inductor current for disabling said pulse generator when said signal representing said inductor current exceeds said voltage derived from output voltage.

12. The power converter as recited in claim 1, further including an integrator for smoothing said signal representing said inductor current.

13. The power converter as recited in claim 1, wherein said pulse generator supplies pulses of a constant duration.

14. The power converter as recited in claim 1, wherein said pulse generator supplies pulses of a constant frequency.

15. The power converter as recited in claim 1, wherein said pulse generator comprises a current source, a capacitor in series with said current source, an integrator for smoothing said signal representing said inductor current, a comparator for comparing a voltage developed on said capacitor with a threshold, a capacitor discharge switch responsive to said comparator in parallel with said capacitor.

16. A method of controlling a power converter, said method comprising steps of developing a voltage representing a difference between a voltage derived from output voltage of said power converter and a signal representing inductor current of said power converter, charging a capacitor with a current proportional to said voltage developed in said developing step thus developing a ramp signal, comparing said ramp signal developed across said capacitor by said charging step with a threshold, and controlling a switch driver for applying input power to an inductor of said power converter in accordance with a result of said comparing step.

17. The method as recited in claim 16, wherein said power converter is a multi-phase power converter.

18. The method as recited in claim 16, wherein said power converter is a constant on time (COT) power converter.

19. The method as recited in claim 16, wherein said power converter is a constant frequency power converter.

20. The method as recited in claim 16, wherein said power converter is a variable on-time, variable off-time power converter.

* * * * *